(12) United States Patent
Morita

(10) Patent No.: US 8,749,834 B2
(45) Date of Patent: Jun. 10, 2014

(54) INFORMATION PROCESSING APPARATUS THAT PERFORM MARGIN REDUCTION DEPENDING ON THE COLUMN GROUP STRUCTURE, METHOD FOR CONTROLLING SAME, AND STORAGE MEDIUM ON WHICH COMPUTER PROGRAM HAS BEEN RECORDED

(75) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 147 days.

(21) Appl. No.: 13/116,513

(22) Filed: May 26, 2011

(65) Prior Publication Data
US 2011/0310403 A1 Dec. 22, 2011

(30) Foreign Application Priority Data
Jun. 18, 2010 (JP) ................................. 2010-139192

(51) Int. Cl.
*G06F 15/00* (2006.01)
*G06F 3/12* (2006.01)
(52) U.S. Cl.
USPC .......................................... 358/1.2; 358/1.18
(58) Field of Classification Search
USPC ........... 358/1.1, 1.2, 1.9, 1.12, 1.18; 382/175, 382/276, 282, 298, 293; 707/517, 518, 520, 707/527; 715/243, 249, 251, 252, 273, 277
See application file for complete search history.

(56) References Cited

U.S. PATENT DOCUMENTS

| 7,692,834 | B2 | 4/2010 | Matsuzaki |
| 7,952,594 | B2 | 5/2011 | Morita et al. |
| 2005/0225540 | A1* | 10/2005 | Kawakami et al. ........... 345/173 |
| 2010/0088592 | A1* | 4/2010 | Hosotsubo .................... 715/255 |

FOREIGN PATENT DOCUMENTS

JP 2006-48520 A 2/2006

* cited by examiner

*Primary Examiner* — Gabriel Garcia
(74) *Attorney, Agent, or Firm* — Fitzpatrick, Cella, Harper & Scinto

(57) ABSTRACT

A computer executes blocking processing for an object based on the size of a blank space between objects included in document data to thereby generate a block. Then, the computer divides the block in the vertical direction, and detects the column group structure of document data based on the division result. When a multiple-column structure is included in the detected column group structure, the computer performs reblocking processing for an object of a column included in a column group area corresponding to the multiple-column structure. Then, the computer performs margin reduction processing for reducing a blank space between blocks included in the column group area by setting the column group area subject to reblocking as the subject to be processed.

6 Claims, 18 Drawing Sheets

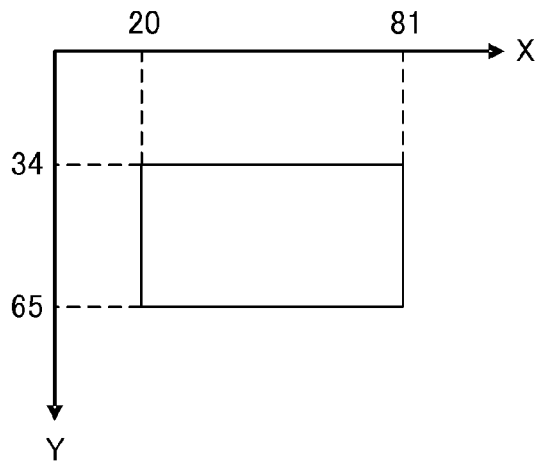

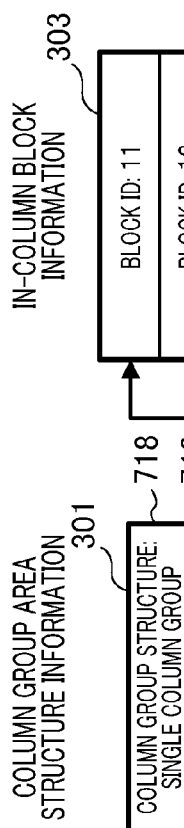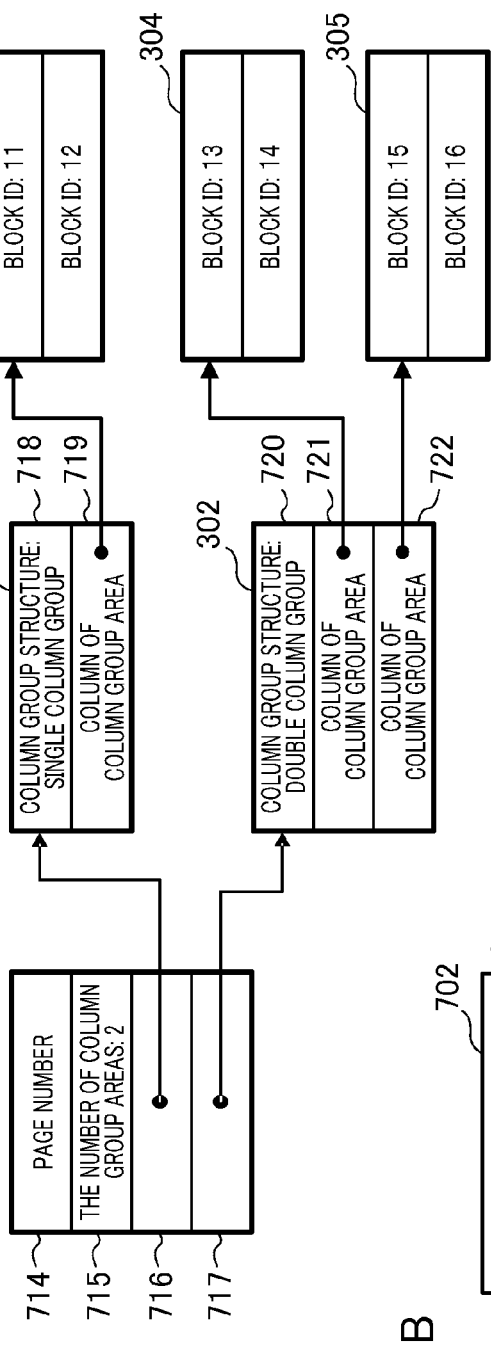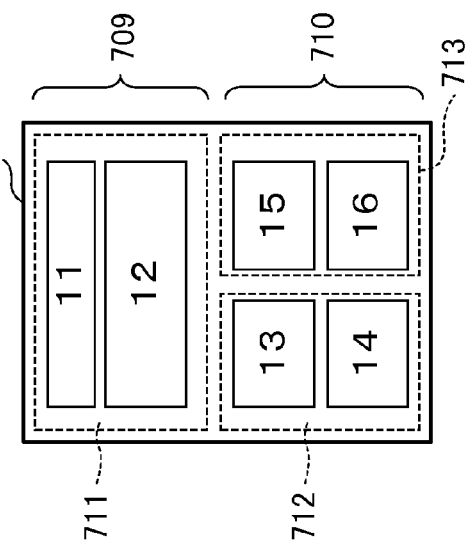
FIG. 7A
FIG. 7B

INFORMATION PROCESSING APPARATUS THAT PERFORM MARGIN REDUCTION DEPENDING ON THE COLUMN GROUP STRUCTURE, METHOD FOR CONTROLLING SAME, AND STORAGE MEDIUM ON WHICH COMPUTER PROGRAM HAS BEEN RECORDED

BACKGROUND OF THE INVENTION

1. Field of the Invention

The present invention relates to an information processing apparatus, a method for controlling the same, and a storage medium on which a computer program has been recorded.

2. Description of the Related Art

A technology that processes data of the original document for re-layout to save paper sheets upon printing the document has been proposed. More specifically, a method may be reducing a margin between contents, such as a line spacing, a gap between drawings, or the like. Japanese Patent Laid-Open No. 2006-48520 discloses an image processing system that analyses input data, divides it into objects, reduces the size of an object to be moved, moves the next object to a margin generated by filling the previous object to the upper left corner of a page, and thus generates a removable blank space.

The image processing system disclosed in Japanese Patent Laid-Open No. 2006-48520 fills a margin between contents without taking into account the column group structure included in a document. Thus, in the image processing system, the placement order of objects included in a document may change, which may result in an inconsistency in context.

The present invention provides an information processing apparatus that performs margin reduction processing for reducing a margin included in a document depending on the column group structure in the document, a method for controlling the information processing apparatus, and a storage medium on which a computer program has been recorded.

SUMMARY OF THE INVENTION

According to an aspect of the present invention, an information processing apparatus is provided that includes a reduction unit configured to reduce a blank space of a first column by reducing a blank space between objects included in the first column to a predetermined distance in a page configured by a plurality of column groups including at least the first column and a second column; and a movement unit configured to move a leading object of the second column to a blank space at the lower portion of the first column when the leading object of the second column falls in a blank space at the lower portion of the first column that has been generated by the reduction of a blank space between the objects of the first column by the reduction unit.

According to the information processing apparatus of the present invention, an excess margin in a document can be removed depending on the column group structure in the document. Thus, the placement order of objects included in the document does not change in the column group area corresponding to the column group structure after removal of the excess margin. Consequently, a problem that might cause an inconsistency in context is eliminated.

Further features of the present invention will become apparent from the following description of exemplary embodiments with reference to the attached drawings.

BRIEF DESCRIPTION OF THE DRAWINGS

FIG. 3A is a diagram illustrating an example of object information.

FIG. 3B is a diagram illustrating an example of object information.

FIG. 4A is a diagram illustrating an example of the structure of document data.

FIG. 4B is a diagram illustrating an example of the structure of document data.

FIG. 7A is a diagram illustrating an example of column group structure information.

FIG. 7B is a diagram illustrating an example of column group structure information.

DESCRIPTION OF THE EMBODIMENTS

Figure 1:
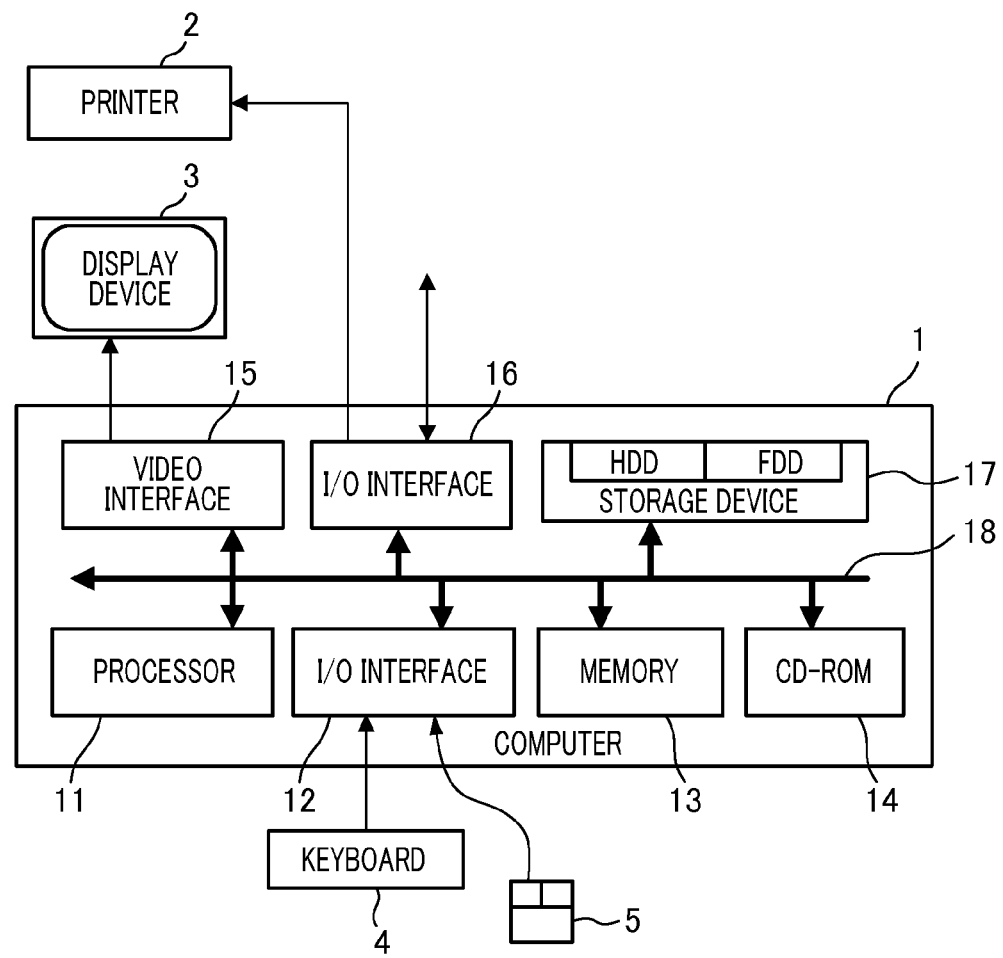
FIG. 1 is a diagram illustrating an example of the system configuration of the present embodiment.

FIG. 1 is a diagram illustrating an example of the system configuration of the present embodiment. The system shown in FIG. 1 includes a computer 1, a printer 2, and a display device 3. The computer 1 is the information processing apparatus of the present embodiment. The computer 1 executes margin reduction processing for document data in which a print layout is already set. Margin reduction processing is processing for reducing the margin of a blank space portion, such as a line spacing or the like, included in document data. The computer 1 executes margin reduction processing, and thus the total number of document pages can be reduced. Also, the computer 1 transmits document data, which has undergone the aforementioned margin reduction processing, to the printer 2 to cause it to print the document data. Further, the computer 1 transmits various display data to the display device 3 to cause it to display the display data. In the present embodiment, the document data is, for example, data for PDF (Portable Document Format) or the like, which includes objects laid out on a page. The printer 2 prints the document data in accordance with the instruction from the computer 1. The display device 3 displays the display data in accordance with the instruction from the computer 1.

The computer 1 includes a processor 11, I/O (Input/Output) interfaces 12 and 16, and a memory 13. The computer 1 further includes a CD-ROM (Compact Disk Read Only Memory) drive 14, a video interface 15, and a storage device 17. The processor 11, the I/O interface 12, the memory 13, the CD-ROM drive 14, the vide interface 15, the I/O interface 16, and the storage device 17 are connected to each other via a system bus 18. The processor 11 controls the computer 1 overall. The processor 11 is, for example, a CPU (Central Processing Unit). The processor 11 receives document data from an external device via a network and the I/O interface 16. The processor 11 analyzes the received document data. The result of analysis of the document data includes, for example, an object list. The object list is a list of object information. The object information is information relating to an object included in document data. The processor 11 stores and manages the object list in the storage device 17. As the operation specific to the present embodiment, the processor 11 divides document data into blocks based on the analysis result of document data, and detects the column group structure of document data based on the block division result. Then, the processor 11 performs margin reduction processing for reducing the blank space portion between blocks included in document data in response to the detected column group structure.

The I/O interface 12 inputs the information, which has been input by a keyboard 4 and a mouse 5, to the computer 1. The I/O interface 16 mediates the transmission of document data from the computer 1 to the printer 2. Further, the I/O interface 16 communicates with external devices through a network. An exemplary network includes LAN (Local Area Network), WAN (Wide Area Network), or the like.

The memory 13 is a storage unit including RAM (Random Access Memory) and ROM (Read Only Memory). The RAM includes the working area for use in processing by the processor 11. The program and data for realizing a method for controlling the computer 1 are stored in the ROM in advance. The CD-ROM drive 14 is a device in which a CD-ROM, i.e., a non-volatile storage medium, is stored. The video interface 15 mediates the transmission of display data from the computer 1 to the display device 3. The storage device 17 stores, for example, document data and an object list. In the example shown in FIG. 1, the storage device 17 includes a HDD (Hard Disk Drive) and a FDD. The term "FDD" is the abbreviation for "Floppy (registered trademark) Disk Drive". The storage device 17 may include a magnetic tape drive.

Figure 2:
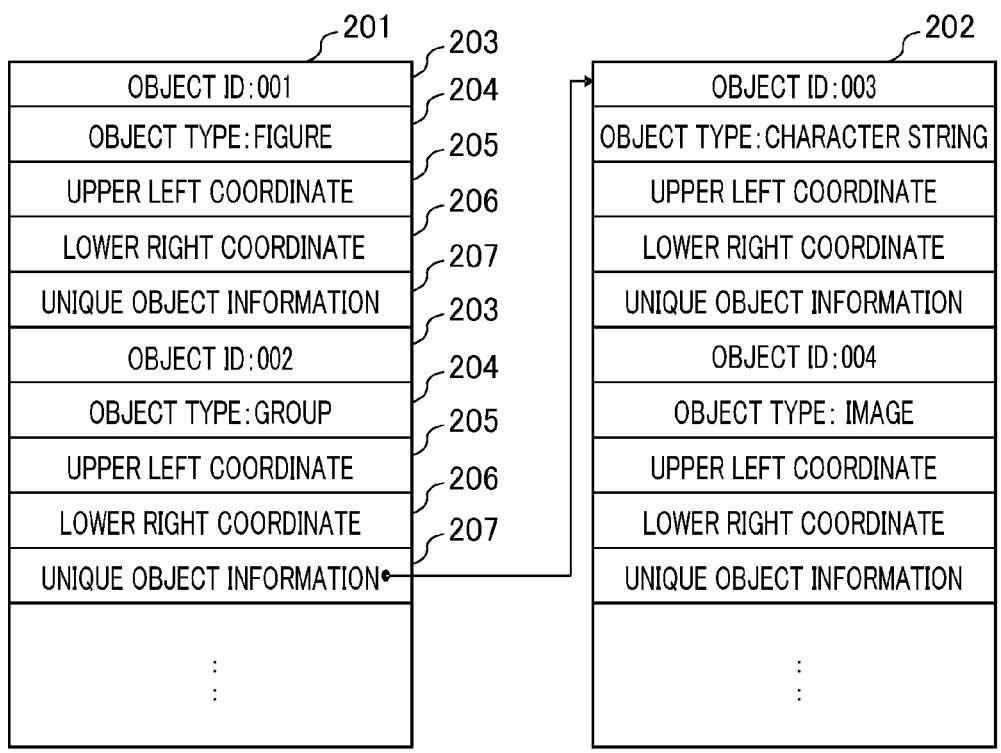
FIG. 2 is a diagram illustrating an example of the management of object information by a processor.

FIG. 2 is a diagram illustrating an example of how object information is managed by a processor. The processor 11 stores object information in an object list 201 in the form of a list structure. Each set of object information includes an object ID 203, an object type 204, an upper-left coordinate 205, a lower-right coordinate 206, and unique object information 207. The object ID 203 is an identifier for uniquely identifying an object. The object type 204 indicates the type of an object. The object type includes, for example, graphic, character string, image, group, and the like. The "group" set in the object type 204 indicates that an object corresponding to the object type 204 is subject to grouping of a plurality of objects. The term "grouping" refers to processing for combining two or more objects into a single object. The combined object is referred to as a "group" or "block". An object to be subject to grouping or blocking is any object including characters and images. Of course, a group itself is subject to grouping. In this case, object information corresponding to the group is hierarchically held. When an object is subject to blocking, the object ID in object information indicates the ID of the block. In the present embodiment, a group consisting of a single object or a group not holding therein an object may also be structurally possible.

The upper-left coordinate 205 indicates the upper-left coordinate of an object. The lower-right coordinate 206 indicates the lower-right coordinate of an object. The unique object information 207 indicates attribute information unique to an object. The unique object information 207 is information indicating a line thickness, a line type, and the like when the object type is, for example, "figure". Also, the unique object information 207 is information indicating a font type, a size, and the like of a character when the object type is, for example, "character string". When the object type 204 in object information is set to "group", pointer information to an object list 202 is set in the unique object information 207. Object information in the object list 202 is object information about an object(s) included in the grouped object corresponding to the object information.

FIG. 3 is a diagram illustrating an example of object information. For example, object information shown in FIG. 3B indicates a rectangular graphical object shown in FIG. 3A, of which the upper-left coordinate is (20, 34), and the lower-right coordinate is (81, 65).

FIG. 4 is a diagram illustrating an example of the structure of document data to be processed in the present embodiment. The computer 1 processes, for example, a PDF format document shown in FIG. 4A. The PDF format document shown in FIG. 4A indicates a graphic that is connected sequentially from the starting point (20, 34) to the point (81, 34), (81, 65), (20, 65), and (20, 34). FIG. 4B shows object information that corresponds to the graphical object read from the PDF format document shown in FIG. 4A. The object information indicates the graphical object that corresponds to the rectangular of which the upper-left coordinate is (20, 34) and the lower-right coordinate is (81, 65).

Figure 5A:
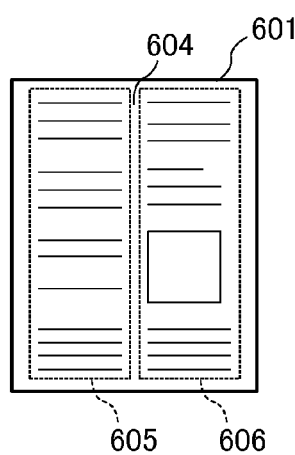
FIG. 5A is a diagram illustrating an area in a page of document data.
Figure 5B:
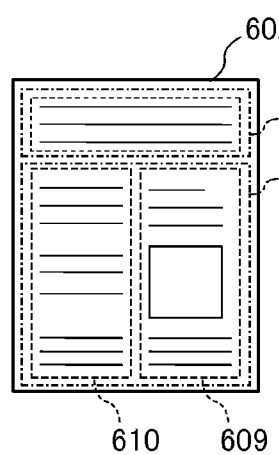
FIG. 5B is a diagram illustrating an area in a page of document data.
Figure 5C:
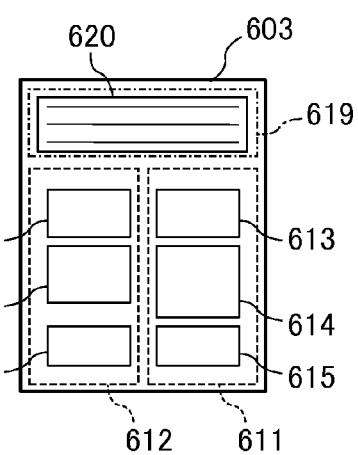
FIG. 5C is a diagram illustrating an area in a page of document data.

FIG. 5 is a diagram illustrating an area in a page of document data to be processed by a computer. The page 601 in FIG. 5A, the page 602 in FIG. 5B, and the page 603 in FIG. 5C are examples of pages included in document data. The page 601 shown in FIG. 5A has a double column structure as a column group structure. In the present embodiment, an area having the same column group structure is referred to as a "column group area". In the present embodiment, an area constituting a column group is referred to as a "column" in a column group area. Thus, in the example shown in FIG. 5A, the area including a column 605 and a column 606 is the column group area that corresponds to the double column structure. Also, each of the column 605 and the column 606 is the column of the column group area. Further, a margin 604 is a margin (column group margin) between the column 605 and the column 606.

In the page 602 shown in FIG. 5B, the area 607 is a column group area having a single column structure. The area 608 is a column group area having a double column structure. The area 609 and the area 610 included in the area 608 are columns of a column group area. In the page 603 shown in FIG. 5C, an area including the area 611 and the area 612 is a column group area having a double column structure. Each of the area 611 and the area 612 is the column of the column group area. The blocks 613, 614, and 615 are blocks in the column 611. The block 616, 617, and 618 are blocks in the column 612. The area 619 is a column group area having a single column structure. The block 620 is a block included in the column in the column group area.

Figure 6:
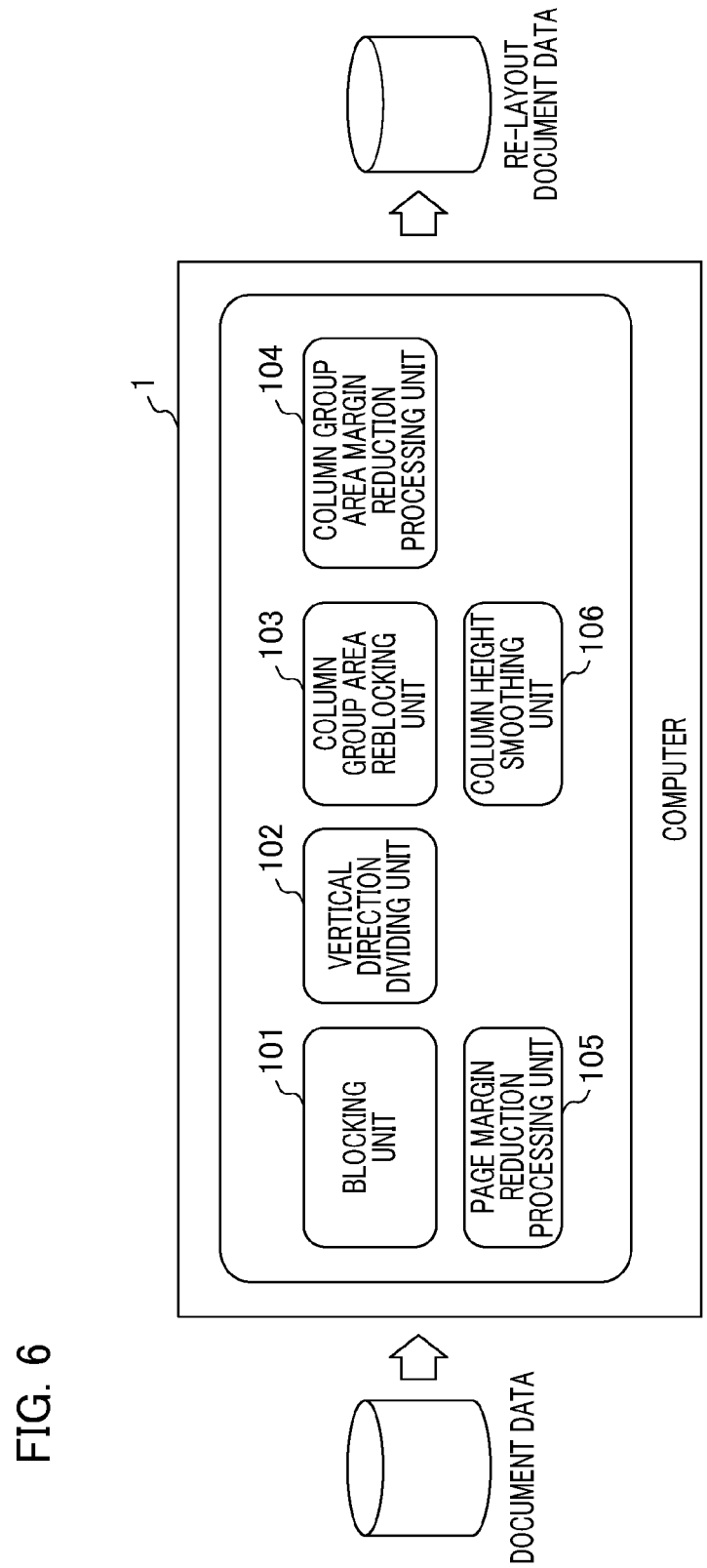
FIG. 6 is a functional block diagram illustrating an example of a computer.

FIG. 6 is a functional block diagram illustrating an example of a computer. The computer 1 includes a blocking unit 101, a vertical direction dividing unit 102, a column group area reblocking unit 103, a column group area margin reduction processing unit 104, a page margin reduction processing unit 105, and a column height smoothing unit 106. In the present embodiment, a computer program for realizing the functions of the blocking unit 101 to the column height smoothing unit 106 is stored in advance in ROM in the memory 13 shown in FIG. 1. The processor 11 reads and executes the computer program stored in ROM, whereby a method for controlling the information processing apparatus of the present embodiment is realized.

The blocking unit 101 scans a blank space between objects included in document data, and generates one or a plurality of blocks by blocking an object based on the size of the blank space between objects obtained by the scanning. In the present embodiment, the blocking unit 101 processes document data in which a print layout is already set. The blocking unit 101 updates object information in the object list each time a block is generated.

The vertical direction dividing unit 102 divides a block in the vertical direction based on the size of the blank space between the objects obtained by scanning the blank space between the objects included in the block that has been generated by the blocking unit 101. The vertical direction dividing unit 102 updates object information in the object list each time a block is divided.

The column group area reblocking unit 103 detects the column group structure of document data based on the block division result obtained by the vertical direction dividing unit 102. More specifically, the column group area reblocking unit 103 detects the column group structure of document data based on the number of divided blocks in a side-by-side relation, i.e., the number of columns. When a plurality of columns (at least a first column and a second column) is in a side-by-side relation, the column group area reblocking unit 103 determines that the column group structure of the column group area including a plurality of columns is a multiple-column structure. For example, in the page 603 shown in FIG. 5C, two columns: the column 611 and the column 612 are in a side-by-side relation. Thus, the column group area reblocking unit 103 determines that the column group structure of the column group area including the column 611 and the column 612 is a double column structure. When another column is not arranged alongside the column, the column group area reblocking unit 103 determines that the column group structure of the column group area including the column is a single column structure. For example, the column included in the column group area 619 of the page 603 shown in FIG. 5C is only a single column. Thus, the column group area reblocking unit 103 determines that the column group structure of the column group area 619 is a single column structure. When the column group area reblocking unit 103 detects the column group structure of document data, the column group area reblocking unit 103 generates column group structure information for each page and stores it in the storage device 17. The column group structure information is information relating to the column group structure.

FIG. 7 is a diagram illustrating an example of column group structure information. FIG. 7A shows column group structure information. A page 702 shown in FIG. 7B is a page that corresponds to column group structure information shown in FIG. 7A. The reference numerals 11 to 16 shown in FIG. 7B indicate the IDs of the blocks in the page 702. The column group structure information shown in FIG. 7A includes in-page column group area information 300, column group area structure information 301 and 302, and in-column block information 303 to 305. The in-page column group area information 300 is information about the column group area included in a page. In the example shown in FIG. 7A, the in-page column group area information 300 includes a page number 714, the number of column group areas 715, and pointers 716 and 717. The page number 714 is the identification number of the page 702 shown in FIG. 7B. The number of column group areas 715 is the number of the column group areas included in a page. The page 702 includes two column group areas: a column group area 709 having a single column structure and a column group area 710 having a double column structure. Thus, the number of column group areas 715 shown in FIG. 7A is set to "2". Each of the pointers 716 and 717 is a pointer for column group area structure information corresponding to a column group area. The pointer 716 is a pointer for column group area structure information 301, and the pointer 717 is a pointer for column group area structure information 302.

Column group area structure information is information about the structure of a column group area. In the example shown in FIG. 7A, the column group area structure information 301 is information about the structure of the column group area 709 having a single column group structure. Also, the column group area structure information 302 is information about the structure of the column group area 710 having a double column group structure. The column group area structure information 301 includes a column group structure 718 and a column 719 of the column group area. The column group structure 718 indicates that the column group area 709 is a single column group. The column 719 of the column group area indicates a column 711 included in the column group area 709. The column of the column group area is linked to in-column block information that corresponds to a block included in each column. For example, the column 719 of the column group area is linked to in-column block information that corresponds to blocks having the IDs of 11 and 12. Likewise, the column group area structure information 302 includes a column group structure 720, and the columns 721 and 722 of the column group area. The column group structure 720 indicates that the column group area 710 is a double column group. The column 721 of the column group area indicates the column 712 included in the column group area 710. The column 722 of the column group area indicates the column 713 included in the column group area 710. The column 721 of the column group area is linked to in-column block information that corresponds to the blocks having the IDs of 13 and 14. Also, the column 722 of the column group area is linked to in-column block information that corresponds to the blocks having the IDs of 15 and 16.

In-column block information is information about a block(s) included in each column. In the example shown in FIG. 7A, the block ID is set as in-column block information. The block ID is the identification number of the block that has been generated as a result of reblocking objects included in a column group area by the column group area reblocking unit 103. In other words, in this example, in-column block information indicates the ID of a block to be generated by the column group area reblocking unit 103. In in-column block information, the block IDs, which correspond from the leading block in a column to the final block in a column, are sequentially set in accordance with the arrangement order of the blocks included in a column.

Referring back to FIG. 6, when a multiple-column structure is included in the detected column group structure, the column group area reblocking unit 103 performs reblocking processing for the objects of the columns included in the column group area corresponding to the multiple-column structure. For example, the block with the block ID of 13 and the block with the block ID of 14 shown in FIG. 7B are blocks that have been generated as a result of reblocking the objects in the column 712 by the column group area reblocking unit 103. The column group area reblocking unit 103 updates object information in the object list each time the objects of a column included in a column group area are subject to reblocking.

By setting the column group area in which the objects are subject to reblocking as the processing object, the column group area margin reduction processing unit 104 performs margin reduction processing (column group area margin reduction processing) for reducing a blank space between blocks included in the column group area. More specifically, among the pages of document data, the column group area margin reduction processing unit 104 determines whether or not a block is moveable between a first page and a second page including a column group area in which the objects are subject to reblocking. When a block is moveable between the first page and the second page, the column group area margin reduction processing unit 104 reduces a blank space between blocks included in a column by setting the column included in the column group area in which the object of the first and second pages is subject to reblocking as the subject to be sequentially processed. Then, the column group area margin reduction processing unit 104 moves the leading block of the column to be processed next to the column in which a blank space between blocks has been reduced. In the processing for moving the leading block, the column group area margin reduction processing unit 104 determines whether or not the leading block of the column to be processed next falls in the column of which the blank space has been reduced when the blank space between blocks included in the column to be currently processed has been reduced. When the leading block of the column to be processed next falls in the column of which the blank space has been reduced, the column group area margin reduction processing unit 104 moves the leading block of the column to be processed next to the column of which the blank space has been reduced.

The page margin reduction processing unit 105 performs margin reduction processing (page margin reduction processing) for reducing a blank space between blocks included in a page by setting the page of document data as the subject to be processed. More specifically, when only a single column structure is included in the column group structure detected by the column group area reblocking unit 103, the page margin reduction processing unit 105 reduces a blank space between blocks included in the page that includes the column group area corresponding to the column group structure. Then, the page margin reduction processing unit 105 moves the leading block of the page following this page to the page in which the blank space between blocks has been reduced.

In addition, when the heights of the columns have been smoothed by the column height smoothing unit 106, the page margin reduction processing unit 105 performs page margin reduction processing by setting a page including at least the smoothed column as the subject to be processed. For example, the page margin reduction processing unit 105 reduces a blank space between blocks included in a page including the smoothed column, and moves the leading block of the page following this page to the page in which the blank space between blocks has been reduced. By the page margin reduction processing performed by the page margin reduction processing unit 105 or the column group area margin reduction processing performed by the column group area margin reduction processing unit 104, document data subject to re-layout is generated as document data to be output.

When a multiple-column structure is included in the column group structure that has been detected by the column group area reblocking unit 103, the column height smoothing unit 106 smoothes the heights of the columns corresponding to the multiple-column structure.

Figure 8:
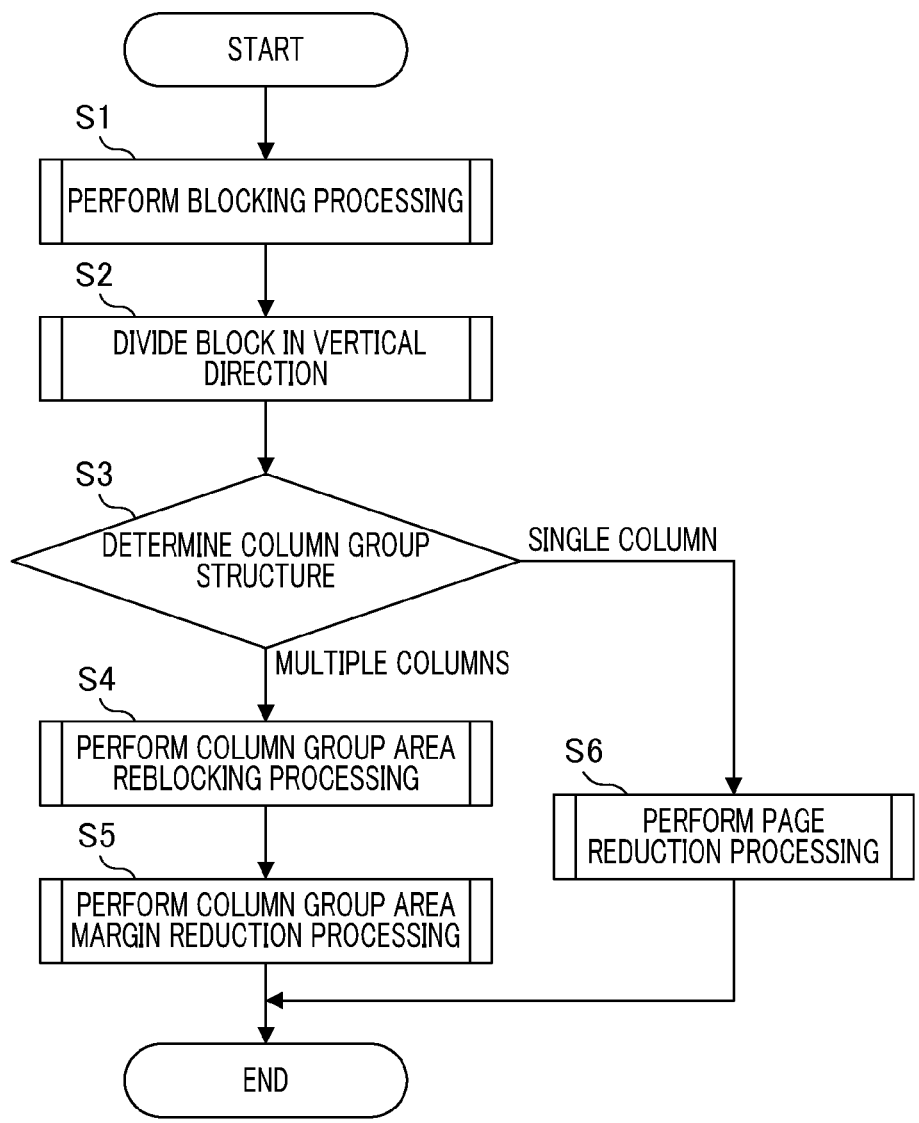
FIG. 8 is a flowchart illustrating the overall operation processing performed by an information processing apparatus according to a first embodiment.

FIG. 8 is a flowchart illustrating the overall operation processing performed by an information processing apparatus according to a first embodiment of the present invention. The flowchart of the present invention is realized by the fact that a CPU reads and executes a program relating to processing from a memory. Firstly, the blocking unit 101 of the computer 1 executes blocking processing for an object included in document data (step S1). Next, the vertical direction dividing unit 102 performs vertical direction division processing, and divides the blocks, which have been generated by blocking processing in step S1, in the vertical direction (step S2). For example, in FIG. 15B, since there is a vertical directional margin between the blocks A-C and the blocks D-F, the vertical direction dividing unit 102 may perform vertical direction division processing. Next, the column group area reblocking unit 103 determines the column group structure of document data based on the block division result by the vertical direction dividing unit 102 (step S3). When the column group area reblocking unit 103 determines that the column group structure of document data is only a single column structure, the page margin reduction processing unit 105 performs page margin reduction processing by setting the page of document data as the subject to be processed (step S6).

When the column group area reblocking unit 103 determines that a multiple-column structure is included in the column group structure of document data, the process advances to step S4. Then, the column group area reblocking unit 103 performs column group area reblocking processing for reblocking the objects of the columns included in a column group area corresponding to a multiple-column structure (step S4). Next, the column group area margin reduction processing unit 104 performs column group area margin reduction processing (step S5), and the process is ended.

Figure 9:
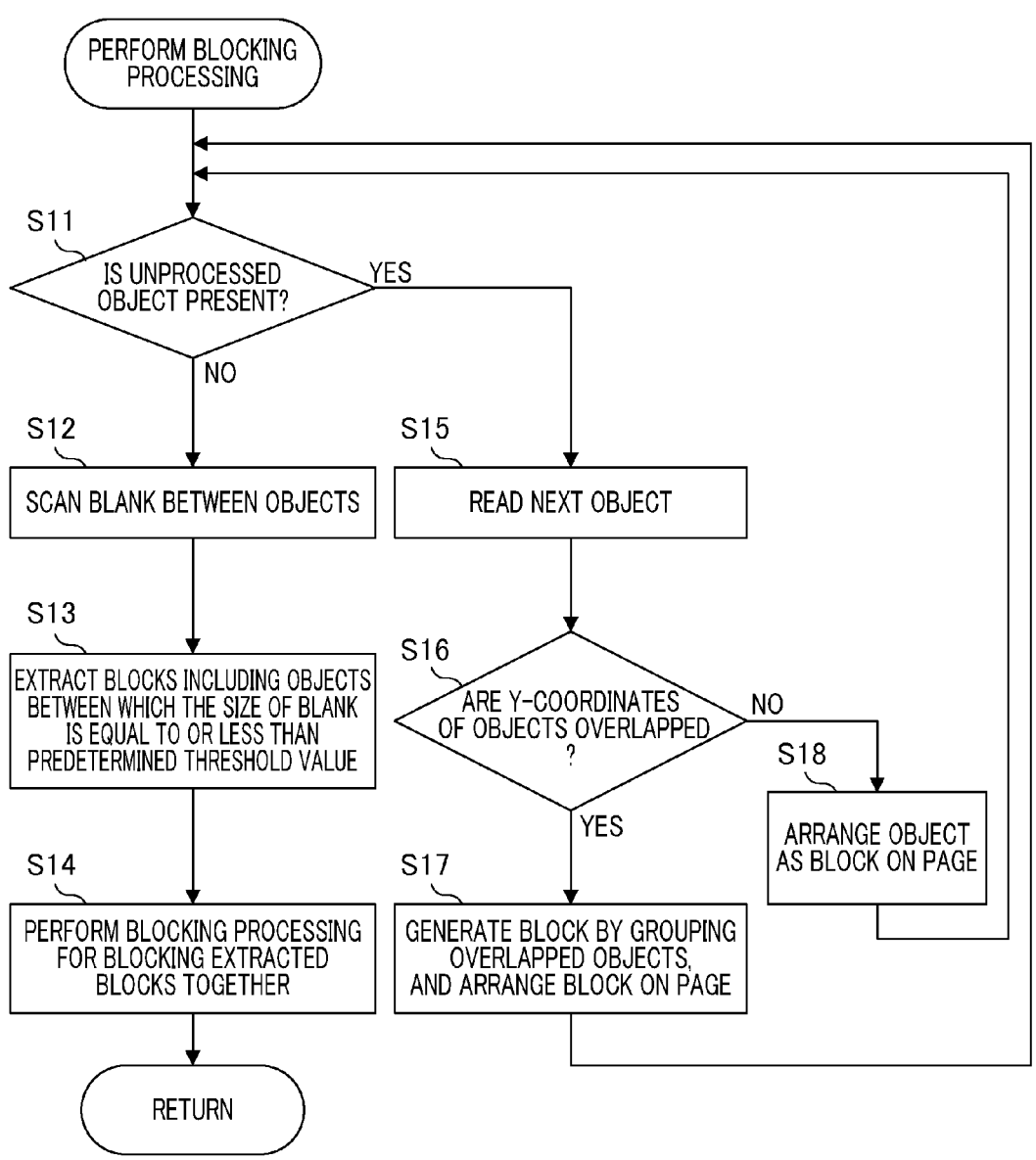
FIG. 9 is a flowchart illustrating an example of blocking processing.

FIG. 9 is a flowchart illustrating an example of blocking processing in step S1 shown in FIG. 8. Firstly, the blocking unit 101 determines whether or not an unprocessed object is present in the page of document data (step S11). When an unprocessed object is present, the blocking unit 101 reads an object to be processed next, that is, the leading object of the unprocessed objects (step S15). Next, the blocking unit 101 determines whether or not the Y-coordinate of the read object overlaps with the Y-coordinate of the object, which has already been arranged on a page, in the page (step S16). When the Y-coordinate of the read object does not overlap with the Y-coordinate of the object that has already been read, the blocking unit 101 arranges the read object as a block on a page (step S18), and the process returns to step S11.

Figure 10A:
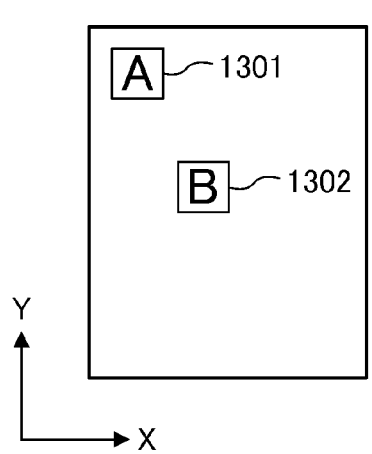
FIG. 10A is a diagram illustrating the arrangement and blocking of objects in a page.

FIG. 10 is a diagram illustrating the arrangement and blocking of objects in a page. FIG. 10A shows the positional relationship between an object 1301 that has already been arranged on a page and an object 1302 that has been read in step S15. In the example shown in FIG. 10A, the Y-coordinate of the object 1301 does not overlap with the Y-coordinate of the object 1302. Thus, the blocking unit 101 arranges the object 1302 as a block on a page.

Figure 10B:
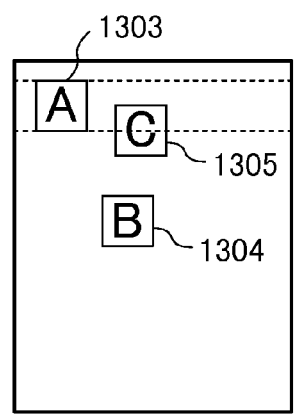
FIG. 10B is a diagram illustrating the arrangement and blocking of objects in a page.
Figure 10C:
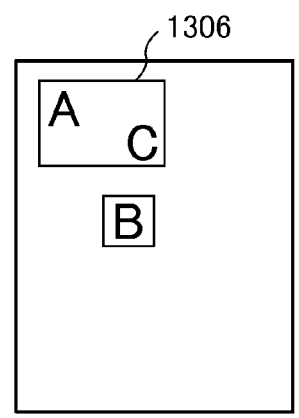
FIG. 10C is a diagram illustrating the arrangement and blocking of objects in a page.

Referring back to FIG. 9, when the Y-coordinate of the read object overlaps with the Y-coordinate of the object that has already been read, the blocking unit 101 generates a block by grouping the overlapped objects, and arranges the block on a page (step S17). For example, as shown in FIG. 10B, the Y-coordinate of an object 1305, i.e., the object that has been read after processing the object 1302, overlaps with the Y-coordinate of an object 1303. Thus, the blocking unit 101 generates a block 1306 by grouping the objects 1303 and 1305 as shown in FIG. 10C, and arranges the block 1306 on a page. When the object 1303 is a block, the blocking unit 101 temporarily releases the blocking of the object 1303, and then performs reblocking processing for it. Also, when the Y-coordinate of the object 1305 overlaps with the Y-coordinate of a plurality of objects on a page, all of the overlapped objects are subject to blocking.

Referring back to FIG. 9, when an unprocessed object is not present, the blocking unit 101 scans a blank space between objects included in all of the blocks arranged on a page in a horizontal direction (X-direction in the example shown in FIG. 10) (step S12), and detects the size of a blank space between objects. In this example, the size of a blank space between objects is the size of a Y-directional blank space between objects. Next, the blocking unit 101 extracts blocks including objects between which the size of the detected blank space is equal to or less than a predetermined threshold value (step S13). Then, the extracted blocks are subject to blocking together by the blocking unit 101 (step S14), and the process is ended. The blocking unit 101 does not perform blocking processing for blocks including objects between which the size of the detected blank space is equal to or less than a predetermined threshold value, and treats them as independent blocks. For example, if the size of a blank space between the block 1306 and block 1307 is equal to or less than a threshold value in FIG. 10C, both are brought together as a single block.

Figure 11:
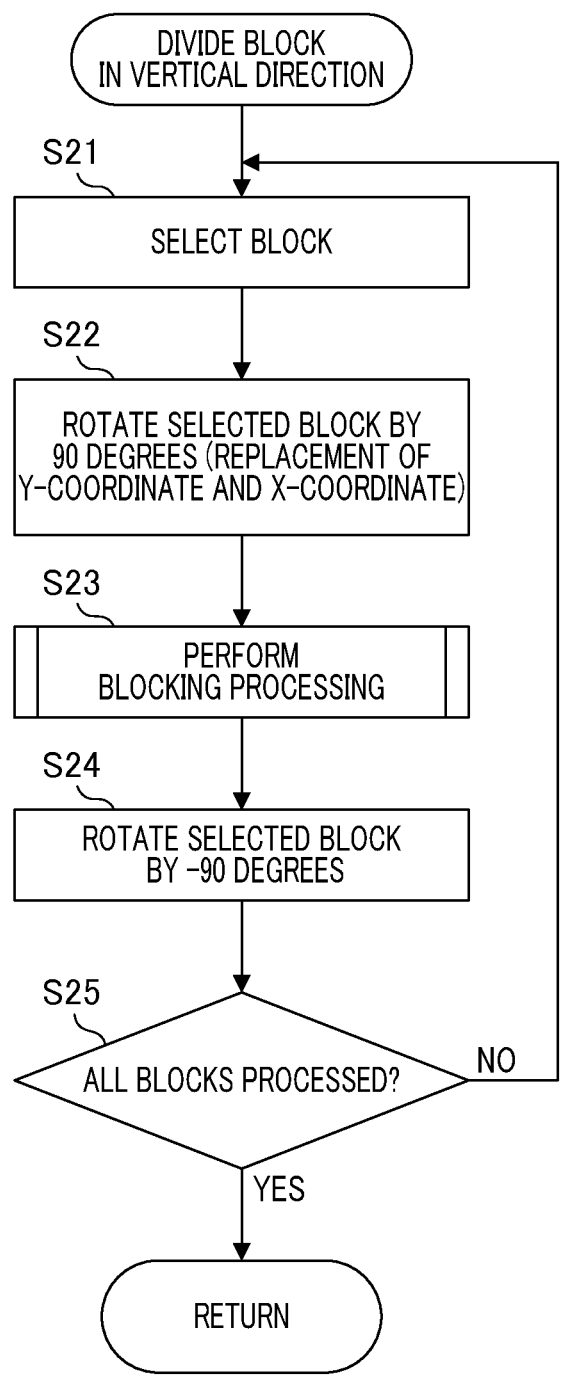
FIG. 11 is a flowchart illustrating vertical direction block division processing.

FIG. 11 is a flowchart illustrating vertical direction block division processing in step S2 shown in FIG. 8. The vertical direction dividing unit 102 performs the following processing for a block that has been obtained by blocking processing by the blocking unit 101. Firstly, the vertical direction dividing unit 102 selects a block (step S21). Next, the vertical direction dividing unit 102 rotates the selected block by 90 degrees (step S22). More specifically, the vertical direction dividing unit 102 replaces the Y-coordinate and the X-coordinate of the selected block. The reason why rotation processing is carried out is to make the scanning directions in blocking processing described with reference to FIG. 9 uniform.

Next, the vertical direction dividing unit 102 scans a blank space between objects included in the block that has been rotated by 90 degrees, and the objects are subject to blocking based on the size of a blank space between the objects obtained by the scanning (step S23). For example, if a blank space between the object A and the object C in the block 1306 in FIG. 10C is equal to or more than a threshold value, the object A and the object C are separated to each other. Next, the vertical direction dividing unit 102 sequentially selects a block from the blocks obtained by blocking in step S23, converts the Y-coordinate and the X-coordinate of the selected block, and rotates the block by −90 degrees (step S24). In this manner, the selected block is rotated in the direction reverse to the rotation direction in step S22. Next, the vertical direction dividing unit 102 determines whether or not processing for all of the blocks has been completed (step S25). If there is a block for which the processing has not been completed, the process returns to step S21. When processing for all of the blocks has been completed, the process is ended. By performing vertical direction block division processing as described above, one or a plurality of blocks, which are segmented by a vertical directional blank space, is generated.

Figure 12:
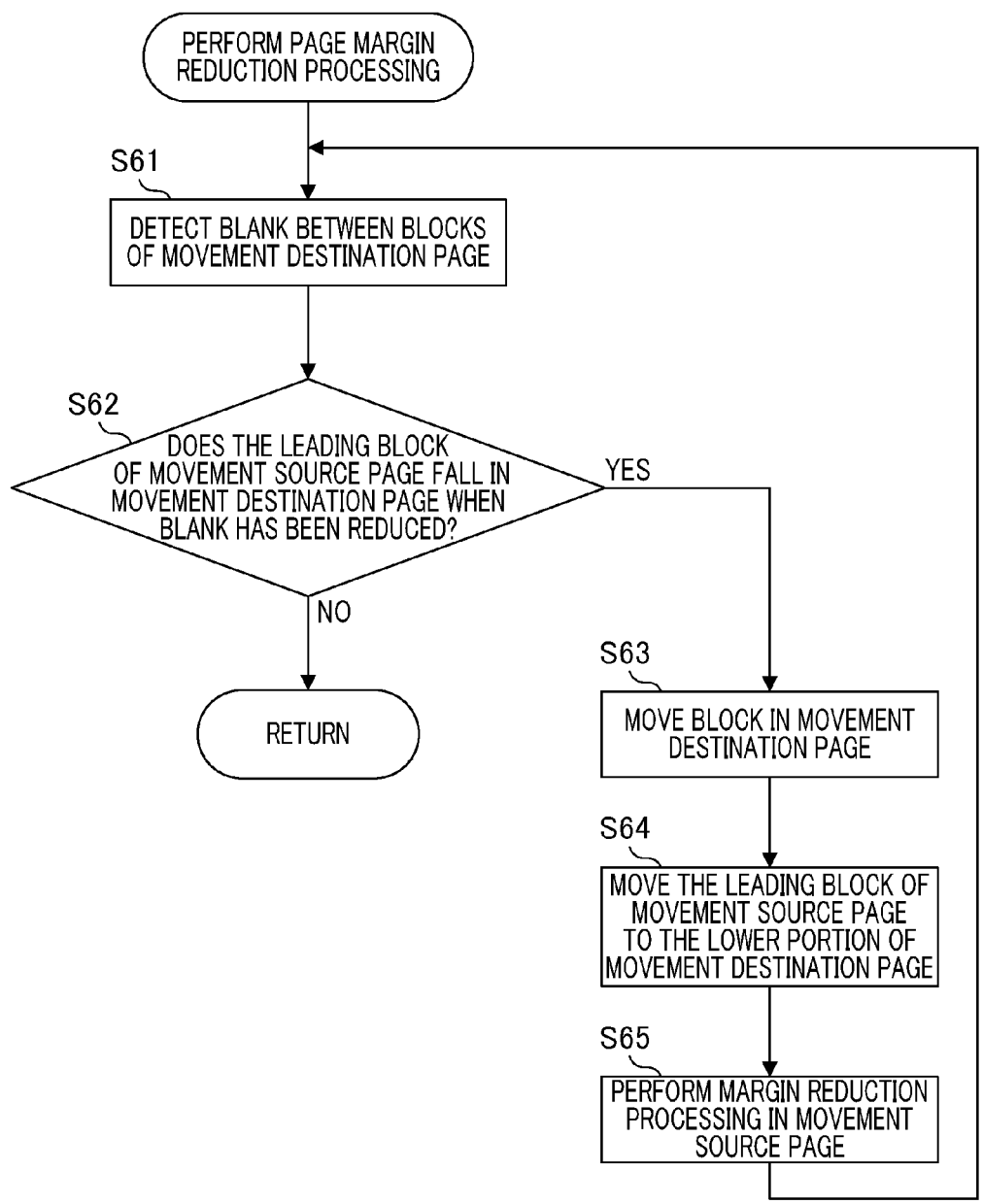
FIG. 12 is a flowchart illustrating an example of page margin reduction processing.
Figure 13A:
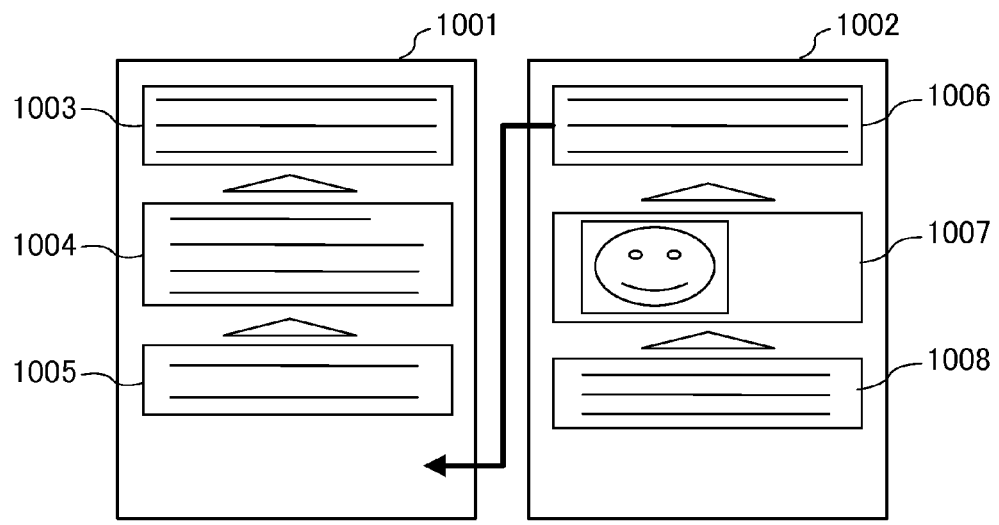
FIG. 13A is a diagram illustrating an example of page margin reduction processing.

FIG. 12 is a flowchart illustrating an example of page margin reduction processing in step S6 shown in FIG. 8. In this example, the page margin reduction processing unit 105 sequentially performs page margin reduction processing for a page 1001 and a page 1002 shown in FIG. 13A. The page 1001 is a movement destination page. The movement destination page is a page that is the movement destination of a block included in the movement source page. The page 1002 is a movement source page. The movement source page is the next page of the movement destination page, and is a page in which a block to be moved on the movement destination page is included.

Firstly, the page margin reduction processing unit 105 detects a blank space between blocks of a movement destination page (step S61). For example, the page margin reduction processing unit 105 acquires the blocks 1003 to 1005 included in the page 1001 shown in FIG. 13A, and detects a blank space between the acquired blocks.

Next, the page margin reduction processing unit 105 determines whether or not the leading block of the movement source page falls in the movement destination page when the blank space, which has been detected in the movement destination page, has been reduced to a predetermined distance (step S62). For example, when a blank space between blocks 1004 and 1005 in the page 1001 shown in FIG. 13A has been reduced to a predetermined distance, the page margin reduction processing unit 105 determines whether or not a block 1006 in the page 1002 falls in the page 1001. More specifically, the page margin reduction processing unit 105 sums values by subtracting a minimum value (correspond to a predetermined distance described above) of a blank space between blocks, which has been set by a user in advance, from all of the detected blank spaces, and thereby calculates the height of an excess blank space. The page margin reduction processing unit 105 determines a value obtained by subtracting a predetermined margin of the page from a blank space between the final block of the movement destination page and the lower end of the movement destination page as a page lower portion blank space. Then, the page margin reduction processing unit 105 determines a value, which is equal to the excess blank space plus the page lower portion blank space, as a "post-margin reduction processing blank space". The page margin reduction processing unit 105 determines whether or not the leading block of the movement source page falls in the determined post-margin reduction processing blank space.

When the leading block of the movement source page falls in the post-margin reduction processing blank space, the page margin reduction processing unit 105 determines that the leading block of the movement source page falls in the movement destination page. When the leading block of the movement source page does not fall in the post-margin reduction processing blank space, the page margin reduction processing unit 105 determines that the leading block of the movement source page does not fall in the movement destination page. When the page margin reduction processing unit 105 determines that the leading block of the movement source page does not fall in the movement destination page, the process is ended.

Figure 13B:
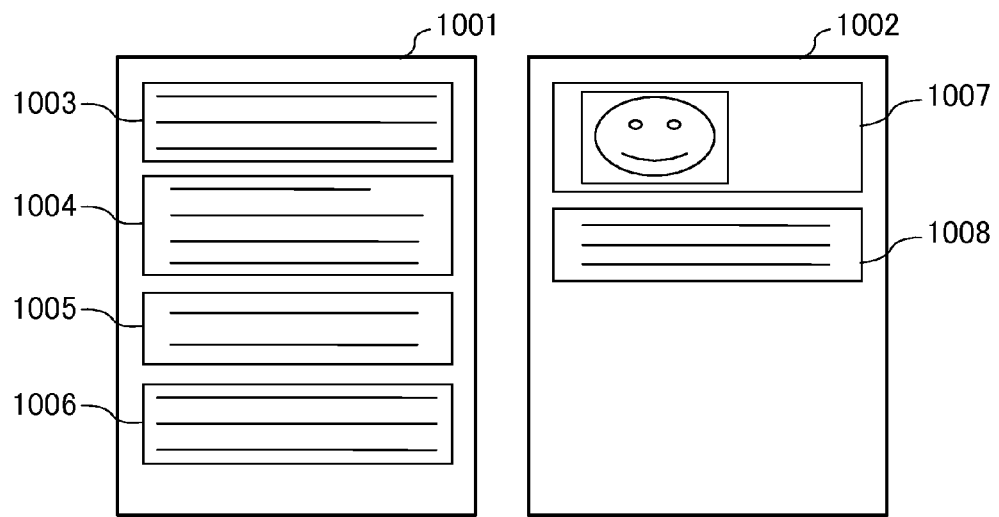
FIG. 13B is a diagram illustrating an example of page margin reduction processing.

When the page margin reduction processing unit 105 determines that the leading block of the movement source page falls in the movement destination page, the page margin reduction processing unit 105 moves a block in the movement destination page so as to reduce the excess margin (step S63). Next, the page margin reduction processing unit 105 moves the leading block of the movement source page to the lower portion of the final block in the movement destination page (step S64). For example, the page margin reduction processing unit 105 moves the block 1006 in the page 1002 shown in FIG. 13A to the lower portion of the block 1005 in the page 1001. Then, the page margin reduction processing unit 105 performs margin reduction processing in the movement source page (step S65), and the process returns to step S61. In step S65, the page margin reduction processing unit 105 sequentially moves a block subsequent to the leading block upward in order to reduce a blank space generated by the movement of the leading block in step S64. By executing step S65, as shown in FIG. 13B, the blocks 1003 to 1006 are arranged on the page 1001, and the blocks 1007 and 1008 are arranged on the page 1002.

As described with reference to FIG. 12, when the blank space between blocks included in the page to be currently processed has been reduced, the page margin reduction processing unit 105 determines whether or not the leading block of the page to be processed next falls in the page of which the blank space has been reduced (see step S62). Also, when the leading block of the page to be processed next falls in the page of which the blank space has been reduced, the page margin reduction processing unit 105 executes the following processing. The page margin reduction processing unit 105 reduces a blank space between blocks included in the page to be currently processed as well as moves the leading block of the page to be processed next to the page of which the blank space has been reduced (see steps S63 and S64). In this manner, an excess margin included in a document page can be removed, whereby printing papers can be saved.

Figure 14A:
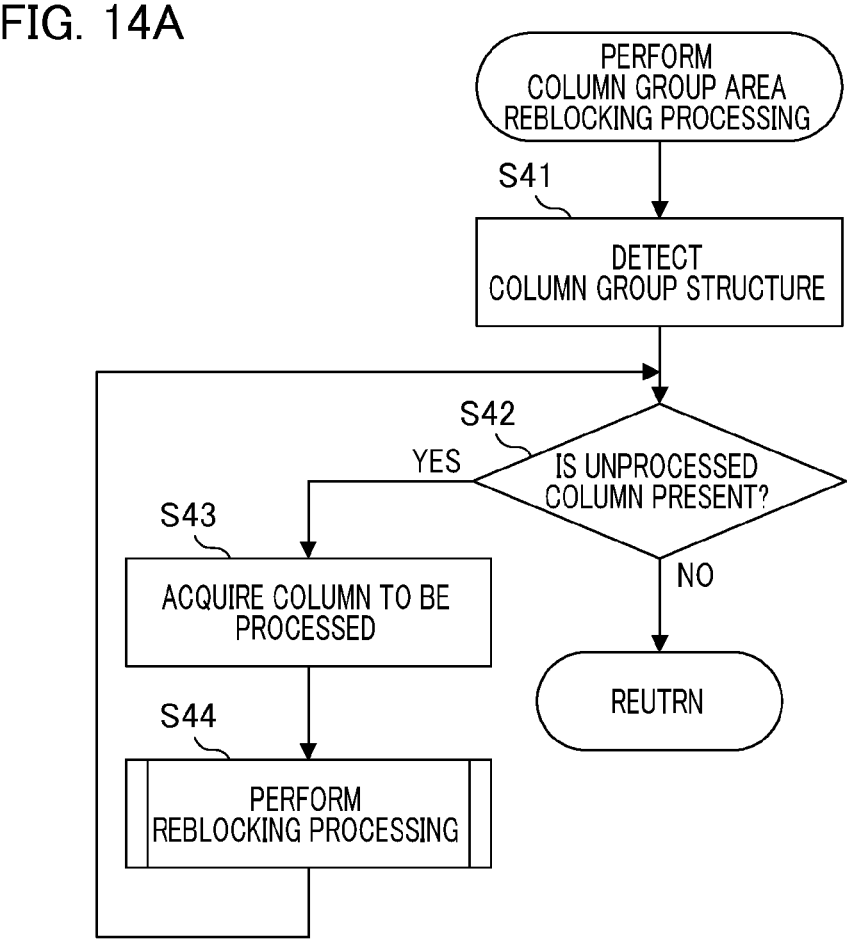
FIG. 14A is a diagram illustrating an example of column group area reblocking processing.

FIG. 14 is a diagram illustrating an example of column group area reblocking processing in step S4 show in FIG. 8. FIG. 14A is a flowchart illustrating an example of column group area reblocking processing. Firstly, the column group area reblocking unit 103 detects the column group structure of document data based on the block division result by the vertical direction dividing unit 102 (step S41). In step S41, the column group area reblocking unit 103 further generates column group structure information for each page, and stores it in the storage device 17. Next, the column group area reblocking unit 103 determines whether or not an unprocessed column is present among the columns of the column group area (step S42). When an unprocessed column is not present, the process is ended.

When an unprocessed column is present, the column group area reblocking unit 103 refers to column group structure information, and acquires the column of the column group area to be processed (step S43). Then, the process advances to step S44. For example, the column group area reblocking unit 103 acquires the column group area having a double column structure including the columns 1602 and 1603 as the column group area included in the page 1601 shown in FIG. 14B.

Also, the column group area reblocking unit 103 acquires the column of the column group area that is set on column group area structure information included in column group structure information (see FIG. 7A). For example, the column group area margin reduction processing unit 104 acquires the column 1602 shown in FIG. 14B as the column of the column group area to be processed.

Figure 14B:
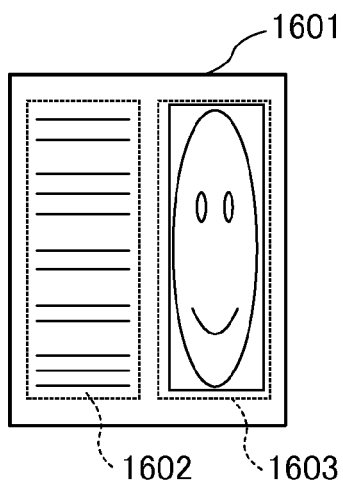
FIG. 14B is a diagram illustrating an example of column group area reblocking processing.
Figure 14C:
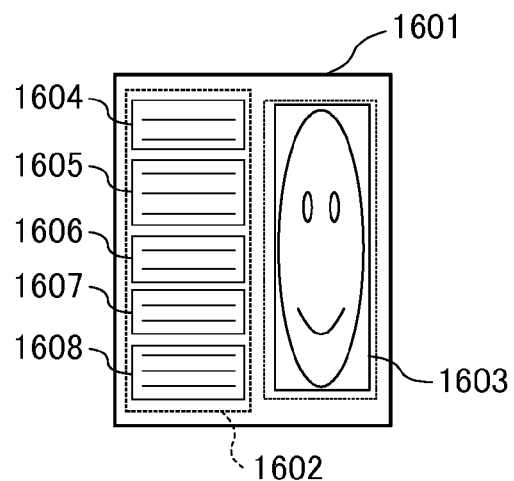
FIG. 14C is a diagram illustrating an example of column group area reblocking processing.

Then, the column group area reblocking unit 103 subjects blocking (reblocking) for an object(s) included in the acquired column (step S44). The column group area reblocking unit 103 refers to, for example, column group area structure information shown in FIG. 7A, and acquires in-column block information which is linked to the acquired column. Then, the column group area reblocking unit 103 performs reblocking processing for an object included in a block that corresponds to the block ID set on the acquired in-column block information. The column group area reblocking unit 103 performs the same process as the blocking processing described with reference to FIG. 9, and performs reblocking processing for an object. After the process in step S44, the process advances to step S42. As a result of reblocking processing for an object in step S44, an object included in the column 1602 shown in FIG. 14B is divided into, for example, five blocks, i.e., blocks 1604 to 1608, as shown in FIG. 14C.

Figure 15A:
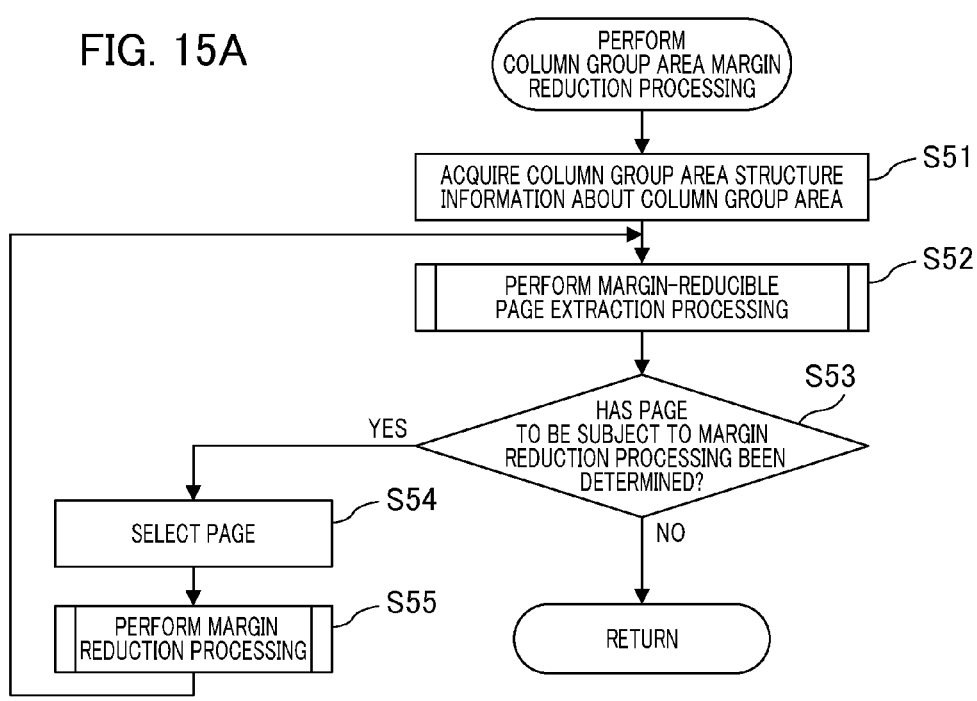
FIG. 15A is a diagram illustrating an example of column group area margin reduction processing.
Figure 15B:
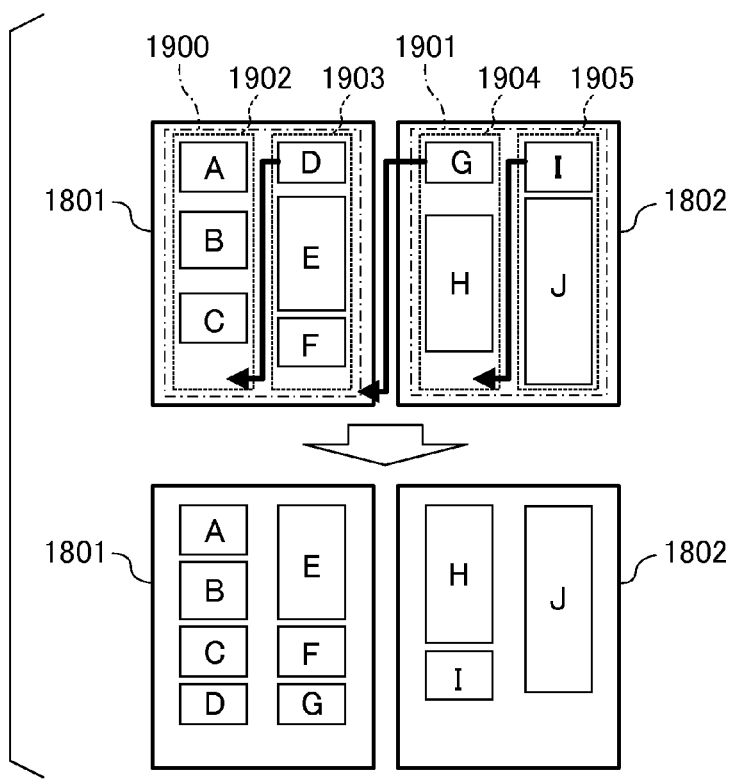
FIG. 15B is a diagram illustrating an example of column group area margin reduction processing.

FIG. 15 is a diagram illustrating an example of column group area margin reduction processing in step S5 shown in FIG. 8. FIG. 15A is a flowchart illustrating an example of column group area margin reduction processing. The column group area margin reduction processing unit 104 refers to column group structure information, and acquires column group area structure information about the lowermost column group area of a page and column group area structure information about the uppermost column group area of the next page by setting a page including a column group area in which an object has been subject to reblocking as the subject to be processed (step S51). For example, the column group area margin reduction processing unit 104 acquires column group area structure information about the lowermost column group area of a page 1801, which is a candidate of the movement destination page, and column group area structure information about the uppermost column group area of a page 1802, which is a candidate of the movement source page, as shown in FIG. 15B. The page 1801 shown in FIG. 15B includes a column group area 1900. The column group area 1900 includes a column 1902 and a column 1903. The column 1902 includes blocks A to C. The column 1903 includes blocks D to F. The page 1802 includes a column group area 1901. The column group area 1901 includes a column 1904 and a column 1905. The column 1904 includes a block G and a block H. The column 1905 includes a block I and a block J.

Referring back to FIG. 15A, the column group area margin reduction processing unit 104 performs margin-reducible page extraction processing using the column group area structure information acquired in step S51 (step S52). Margin-reducible page extraction processing is processing for determining a movement destination page to be subject to margin reduction processing and a movement source page. Next, the column group area margin reduction processing unit 104 determines whether or not the movement destination page to be subject to margin reduction processing and the movement source page have been determined based on the extraction result of the margin-reducible page (step S53). When the movement destination page and the movement source page have not been determined, the process is ended. When the movement destination page and the movement source page have been determined, the process advances to step S54.

Next, the column group area margin reduction processing unit 104 selects the movement destination page (a first page) and the movement source page (a second page) that have been determined in step S53 (step S54). Then, the column group area margin reduction processing unit 104 performs margin reduction processing for reducing a blank space between blocks included in the column group area by setting the column group areas of the movement destination page and the movement source page as the objects to be processed (step S55). More specifically, the column group area margin reduction processing unit 104 sequentially selects the columns of the column group areas included in the movement destination page and the movement source page as the objects to be processed, and executes margin reduction processing by treating the selected columns as a virtual page in the same manner as the page margin reduction processing described with reference to FIG. 12. When a blank space between blocks included in the movement destination column to be currently processed has been reduced to a predetermined distance, the column group area margin reduction processing unit 104 determines whether or not the leading block of the movement source column that is the column to be processed next falls in the column of which the blank space has been reduced. The movement destination column is the column as the destination of a block included in the next column of the movement destination column. The movement source column is the column in which a block to be moved to the previous column is included. In other words, the column group area margin reduction processing unit 104 functions as a reduction unit configured to reduce a blank space of a first column by reducing a blank space between objects included in the first column to a predetermined distance in a page configured by a plurality of column groups including at least the first column and a second column. When the leading block of the movement source column to be processed next falls in the movement destination column in which the blank space has been reduced, the column group area margin reduction processing unit 104 moves the leading block of the movement source column to the movement destination column (the lower portion of the final block thereof) in which the blank space has been reduced. In other words, the column group area margin reduction processing unit 104 functions as a movement unit configured to move the leading object of the second column to the blank space at the lower portion of the first column when the leading object of the second column falls in the blank space at the lower portion of the first column that has been generated by the reduction of the blank space between the objects of the first column.

Figure 16:
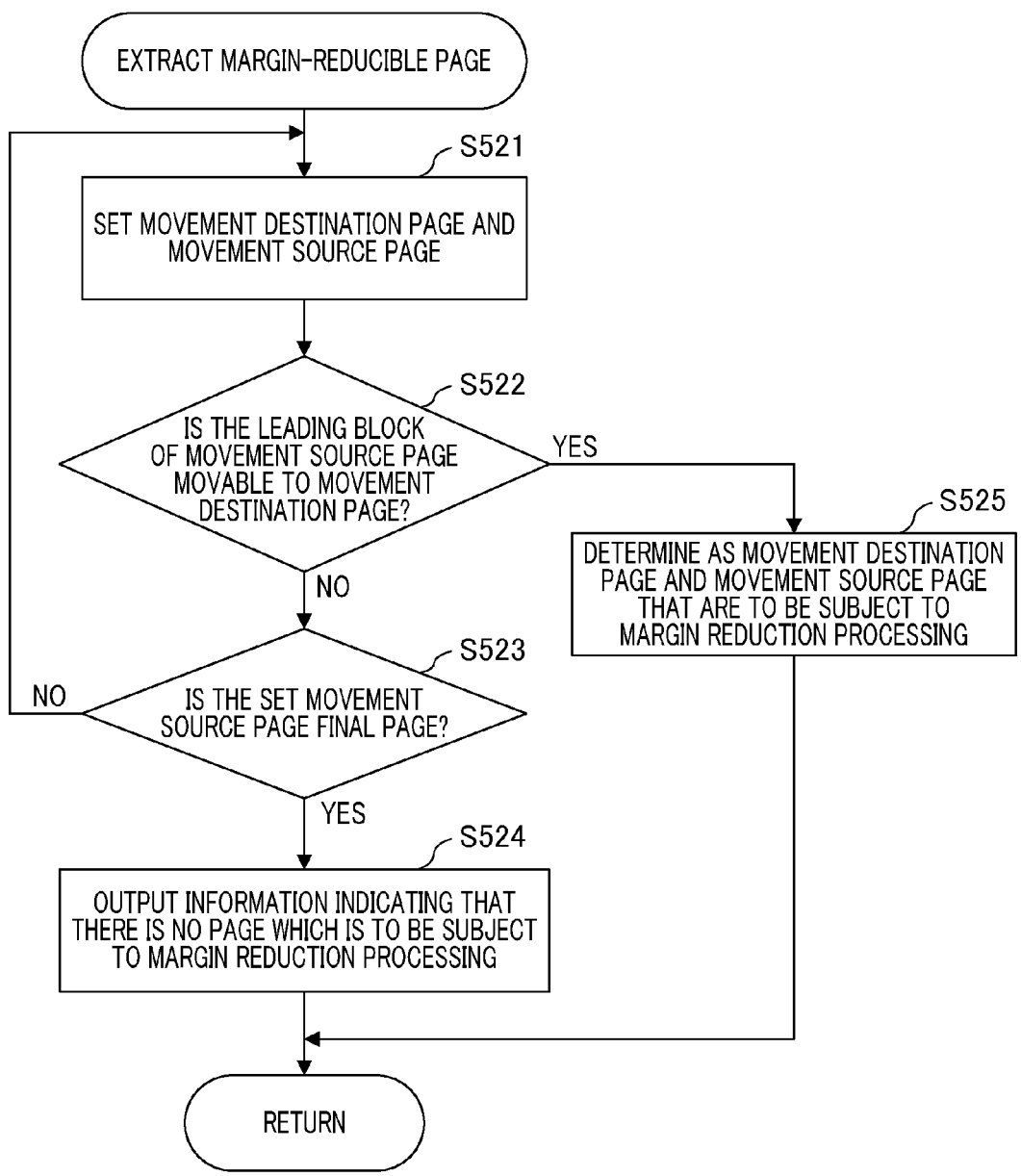
FIG. 16 is a flowchart illustrating extraction processing for a margin-reducible page.

FIG. 16 is a flowchart illustrating extraction processing for a margin-reducible page in step S52 shown in FIG. 15A. Firstly, the column group area margin reduction processing unit 104 sets a movement destination page and a movement source page (step S521). More specifically, the column group area margin reduction processing unit 104 updates a movement destination page to be set to the next page of the movement source page, and updates a movement source page to be set to the next page of the movement source page each time the margin reduction processing in step S55 shown in FIG. 15A has been completed. Next, the column group area margin reduction processing unit 104 performs the following processing using the column group area structure information corresponding to the movement destination page and the movement source page set in step S521 among the column group area structure information acquired in step S51 shown in FIG. 15A. In other words, the column group area margin reduction processing unit 104 determines whether or not the leading block of the movement source page is movable to the movement destination page (step S522).

More specifically, the column group area margin reduction processing unit 104 refers to column group area structure information corresponding to the movement destination page, and acquires in-column block information that is linked to the final column of the column group area. Then, the column group area margin reduction processing unit 104 acquires the coordinate of a block, which corresponds to the block ID set at the end in the acquired in-column block information, from an object list, and sets the acquired coordinate as a first coordinate. The acquired first coordinate is the coordinate of the final block of the final column of the movement destination page. Also, the column group area margin reduction processing unit 104 refers to column group area structure information corresponding to the movement source page, and acquires in-column block information that is linked to the first column of the column group area. Then, the column group area margin reduction processing unit 104 acquires the coordinate of a block, which corresponds to the block ID set at the head in the acquired in-column block information, from an object list, and sets the acquired coordinate as a second coordinate. The second coordinate is the coordinate of the leading block of the first column of the movement source page. The column group area margin reduction processing unit 104 determines whether or not the leading block of the first column of the movement source page falls in a blank space at the lower portion of the final block of the final column of the movement destination page based on the first coordinate and the second coordinate that have been acquired. When the leading block of the first column of the movement source page falls in a blank space at the lower portion of the final block of the final column of the movement destination page, the column group area margin reduction processing unit 104 determines that the leading block of the movement source page is movable to the movement destination page. When the leading block of the first column of the movement source page does not fall in a blank space at the lower portion of the final block of the final column of the movement destination page, the column group area margin reduction processing unit 104 determines that the leading block of the movement source page is not movable to the movement destination page.

When the leading block of the movement source page is movable to the movement destination page, the currently set movement source page and movement destination page are determined as the movement destination page and the movement source page that are to be subject to margin reduction processing (step S525). When the leading block of the movement source page is not movable to the movement destination page, the column group area margin reduction processing unit 104 determines whether or not the currently set movement source page is the final page (step S523). When the currently set movement source page is the final page, the column group area margin reduction processing unit 104 outputs information indicating that a movement destination page and a movement source page, which are to be subject to margin reduction processing, are not present as the processing result (step S524). When the currently set movement source page is not the final page, the process returns to step S521, the movement destination page and the movement source page are set to one page later thereof, respectively.

By performing column group area margin reduction processing described with reference to FIG. 15 and FIG. 16, a blank space between the blocks A and B and a blank space between the blocks B and C are reduced, and the block D is moved to the lower portion of the block C as shown in FIG.

15B, for example. The blocks E and F are moved to the upper side of the page 1801, and the block G is moved to the lower portion of the block F. The block H is moved to the upper side of the page 1802, and the block I is moved to the lower portion of the block H. The block J is moved to the upper side of the page 1802. In this manner, the arrangement state of blocks in the pages 1801 and 1802 becomes the state as shown in FIG. 15C. In other words, according to the information processing apparatus of the first embodiment, an excess margin in a document can be removed depending on the column group structure in the document, whereby the placement order of objects included in the document does not change in the column group area corresponding to the column group structure after removal of the excess margin. Consequently, a problem that might cause an inconsistency of context is eliminated.

Next, a description will be given of a second embodiment of the present invention. In the second embodiment, the computer 1 sequentially executes column height smoothing processing and page margin reduction processing after the process in step S5 shown in FIG. 8. Column height smoothing processing is processing for determining a block to be moved to another column among the blocks included in a column and moving the determined block to the other column such that the heights of the columns corresponding to a multiple-column structure is smoothed. Also, page margin reduction processing that is executed by the computer 1 subsequent to column height smoothing processing is the same processing as page margin reduction processing in step S6 shown in FIG. 8.

Figure 17:
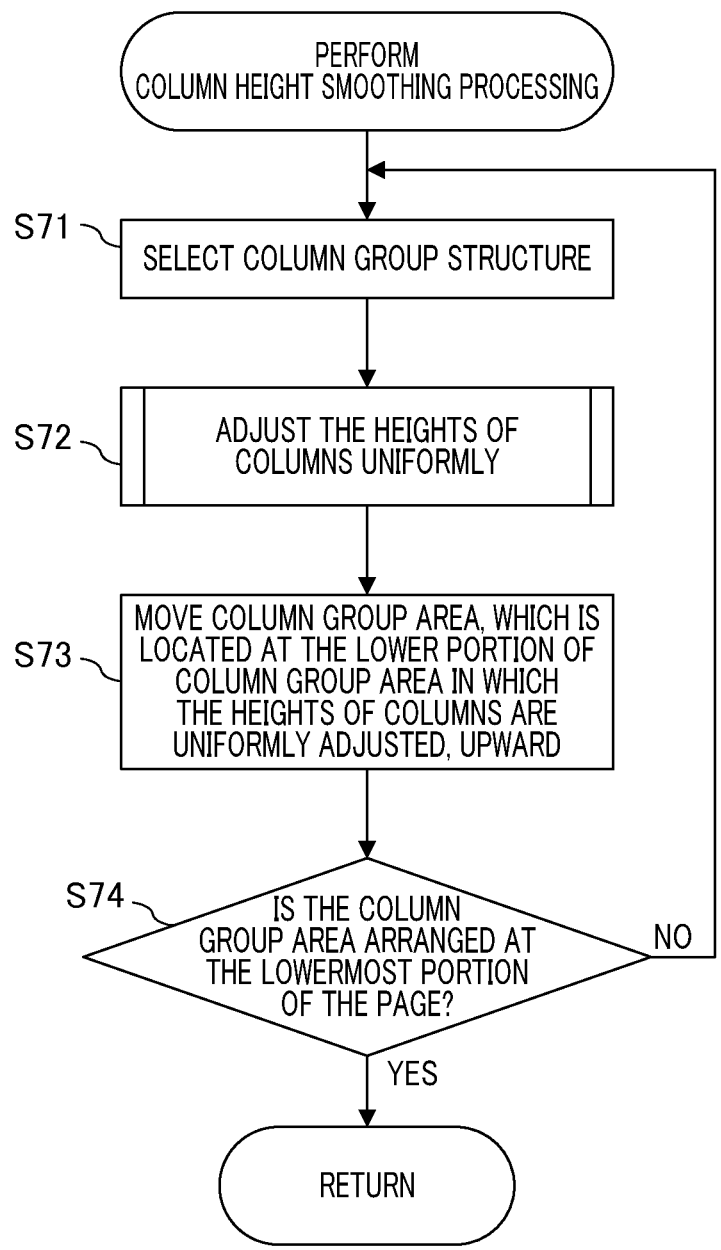
FIG. 17 is a flowchart illustrating an example of column height smoothing processing.

FIG. 17 is a flowchart illustrating an example of column height smoothing processing. Firstly, the column height smoothing unit 106 selects a page in accordance with, for example, a user operation input, and selects a column group area corresponding to the multiple-column structure included in the selected page (step S71). Next, the column height smoothing unit 106 uniformly adjusts the heights of the columns included in the selected column group area (step S72). Then, the column height smoothing unit 106 moves the lower column group area upward such that a margin between a column group area in which the heights of the columns are uniformly adjusted and the lower column group area of the column group area is equal to or less than a predetermined distance (step S73). More specifically, the aforementioned processing corresponds to processing for moving a column group area 2002, which is located at the lower portion of the column group area 2001, upward, when the heights of the columns in a column group area 2001 are uniformly adjusted as shown in FIG. 19.

Next, the column height smoothing unit 106 determines whether or not the selected column group area is the column group area arranged at the lowermost portion of the page (step S74). When the selected column group area is the column group area arranged at the lowermost portion of the page, the process is ended. When the selected column group area is not the column group area arranged at the lowermost portion of the page, the process returns to step S71, and the column height smoothing unit 106 selects a column group area corresponding to the next multiple-column structure.

Figure 18:
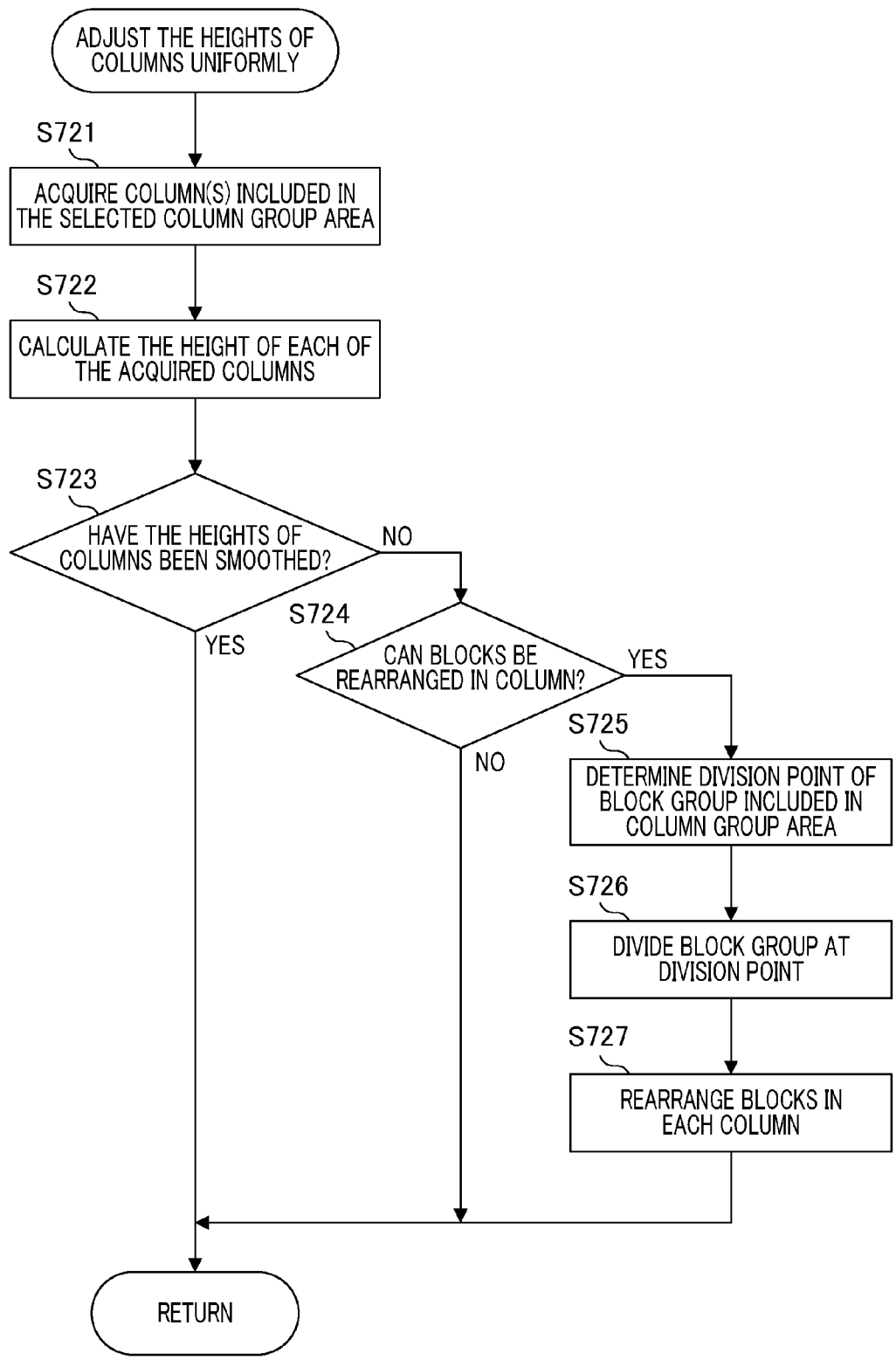
FIG. 18 is a flowchart illustrating processing for uniformly adjusting the heights of columns included in a column group area.
Figure 19A:
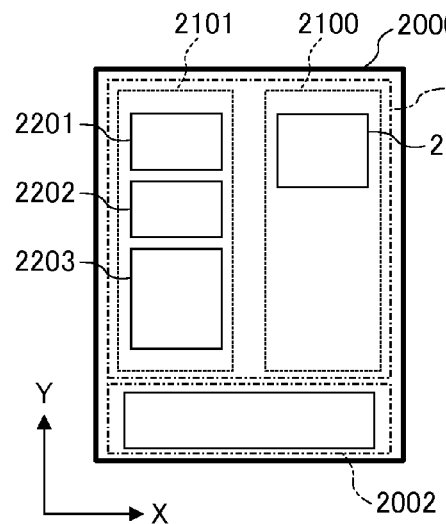
FIG. 19A is a diagram illustrating processing for uniformly adjusting the heights of columns included in a column group area.

FIG. 18 is a flowchart illustrating processing for uniformly adjusting the heights of columns included in a column group area in step S72 shown in FIG. 17. Firstly, the column height smoothing unit 106 acquires a column(s) included in the selected column group area (step S721). In this example, it is assumed that the column group area 2001 that is the column group area of the double column group included in a page 2000 shown in FIG. 19A is selected. The column group area 2002 shown in FIG. 19A is the column group area of a single column group, and thus is not selected. The column height smoothing unit 106 acquires a column 2100 and a column 2101 that are columns included in the column group area 2001.

Next, the column height smoothing unit 106 calculates the height of each of the acquired columns (step S722). In this example, the column height smoothing unit 106 calculates the difference between the Y-coordinate of the uppermost end of the uppermost block and the Y-coordinate of the lowermost end of the lowermost block included in a column as the height of the column. Next, the column height smoothing unit 106 determines whether or not the heights of the columns have been smoothed (step S723). For example, the column height smoothing unit 106 compares the heights of a plurality of columns included in a column group area, and determines whether or not the difference between the heights of the columns is equal to or more than a threshold value. In other words, the column height smoothing unit 106 functions as a comparison unit configured to compare the height of the first column with the height of the second column after the object of the second column is moved by the column group area margin reduction processing unit 104. When the difference between the heights of both columns is equal to or less than a threshold value, the column height smoothing unit 106 determines that the heights of the columns have been smoothed. On the other hand, when the difference between the heights of both columns exceeds a threshold value, the column height smoothing unit 106 determines that the heights of the columns have not been smoothed. For example, the difference between the height of the column 2101 and the height of the column 2100 as shown in FIG. 19A is calculated, and it is determined whether or not the difference between therebetween exceeds a threshold value. When the column height smoothing unit 106 determines that the heights of the columns have been smoothed, the process is ended. When the column height smoothing unit 106 determines that the heights of the columns are not smoothed, the process advances to step S724.

Next, in step S724, the column height smoothing unit 106 determines whether or not blocks can be rearranged in a column (step S724). In this example, the column height smoothing unit 106 determines whether or not two or more blocks are present on either one of the columns acquired in step S721. When two or more blocks are present on either one of the acquired columns, the column height smoothing unit 106 determines that the blocks can be rearranged in the column, and the process advances to step S725. When two or more blocks are not present in either one of the acquired columns, the column height smoothing unit 106 determines that the blocks cannot be rearranged in the column, and the process is ended.

In step S725, the column height smoothing unit 106 determines a division point for a block group included in a column group area (step S725). The division point of a block group included in a column group area (hereinafter referred to simply as "division point") is a point at which a block group constituted by arranging all of the blocks included in a column group area in the vertical direction (Y-direction) is divided. In this example, the division point is a point (boundary point) located at the boundary between blocks.

Figure 19C:
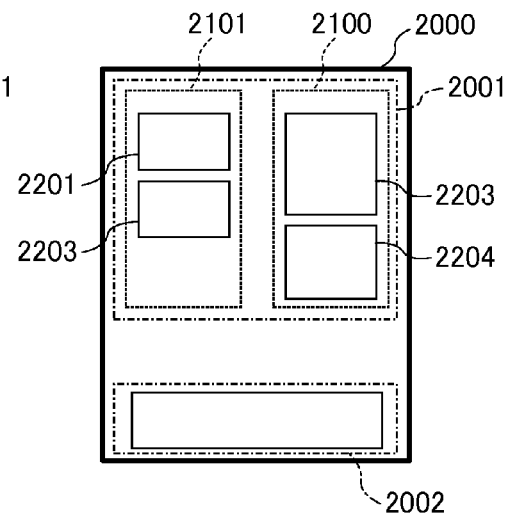
FIG. 19C is a diagram illustrating processing for uniformly adjusting the heights of columns included in a column group area.
Figure 19B:
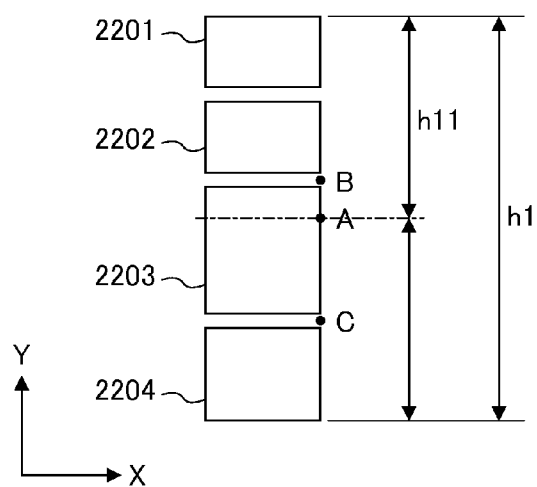
FIG. 19B is a diagram illustrating processing for uniformly adjusting the heights of columns included in a column group area.

The column height smoothing unit 106 determines the division point as follows. Firstly, the column height smoothing unit 106 determines the height of a block group obtained by arranging all of the blocks included in a column group area in the vertical direction (Y-direction). For example, the column height smoothing unit 106 determines the height of a block group (h1) when the blocks 2201 to 2204 shown in FIG. 19A are arranged in the Y-direction as shown in FIG. 19B. Next, the column height smoothing unit 106 calculates a value, which is obtained by dividing the determined height by the number of columns in a column group area, as a division reference value. The division reference value is a reference value for determining a division point. In this example, the number of columns in the column group area 2001 shown in FIG. 19 is two. Thus, the column height smoothing unit 106 divides the h1 shown in FIG. 19B by two to thereby calculate h11 as a division reference value.

Then, the column height smoothing unit 106 determines a division point based on the division reference value and the coordinates of the blocks included in the block group. More specifically, the column height smoothing unit 106 determines a point, which is located lower than the upper end of the uppermost block in the block group by the division reference value, as the reference point. In the example shown in FIG. 19B, the column height smoothing unit 106 determines a point A, which is located lower than the upper end of the uppermost block, i.e., the block 2201 by h11, as the reference point. Among the boundary points between blocks, the column height smoothing unit 106 determines a point corresponding to the reference point as a division point. For example, when the reference point is a boundary point between blocks, the column height smoothing unit 106 determines the reference point as a division point.

Here, the reference point may be located between the upper end and the lower end of a block included in a block group. The block is referred to hereinbelow as a "reference point inclusion block". For example, in the example shown in FIG. 19B, since the reference point, i.e., the point A is located between the upper end and the lower end of a block 2203, the block 2203 is the reference point inclusion block. From a boundary point between the reference point inclusion block and the block that is positioned directly above the reference point inclusion block and a boundary point the reference point inclusion block and the block that is positioned directly below the reference point inclusion block, the column height smoothing unit 106 determines a boundary point closer to the division reference point as the division point. In the example shown in FIG. 19B, a boundary point between a block 2202 and a block 2201 that is positioned directly above the block 2202 is a point B. Also, a boundary point between the block 2202 and the block 2203 that is positioned directly below the block 2202 is a point C. From the point B and the point C, the column height smoothing unit 106 determines the point B that is a boundary point closer to the point A that is the reference point, as a division point.

Referring back to FIG. 18, the column height smoothing unit 106 divides a block group included in a column group area at the division point, and determines a block that is rearranged in each column in the column group area (step S726). For example, the column height smoothing unit 106 divides the block group shown in FIG. 19B at the point B that is the division point. In this manner, a block group is divided at the division point in the order from the top, and a plurality of block groups is generated in sequence. The column height smoothing unit 106 determines the blocks included in the block groups generated by division as the blocks that are rearranged in the column of the column group area. For example, the column height smoothing unit 106 determines the block 2201 and the block 2202, which are included in the first block generated by division, as the blocks that are rearranged in the first column of the column group area, i.e., the column 2101 shown in FIG. 19A. Also, the column height smoothing unit 106 determines the block 2203 and block 2204, which are included in the second block group generated by division, as the blocks that are rearranged in the second column of the column group area, i.e., the column 2100 shown in FIG. 19A.

Referring back to FIG. 18, the column height smoothing unit 106 rearranges the blocks determined in step S726 on each column (step S727). For example, as shown in FIG. 19C, the column height smoothing unit 106 arranges the block 2201 and the block 2202 on the column 2101, and arranges the block 2203 and the block 2204 on the column 2100. According to one embodiment of the present invention, in step S727, the column group area margin reduction processing unit 104 that functions as a movement unit may rearrange the blocks, which has been determined for rearrangement in step S726, on each column. For example, the column height smoothing unit 106 (or the column group area margin reduction processing unit 104) returns a part of the moved blocks to thereby smooth the heights of the columns. In other words, when the difference between the height of the first column and the height of the second column is equal to or more than a threshold value, the column height smoothing unit 106 returns a part of the objects in the first column to the second column such that the difference between the height of the first column and the height of the second column is equal to or less than the threshold value. In this manner, the heights of the columns included in the column group area 2001 are smoothed.

In the second embodiment, the page margin reduction processing unit 105 of the computer 1 executes page margin reduction processing subsequent to column height smoothing processing. In the example shown in FIG. 19C, the column height smoothing unit 106 performs column height smoothing processing for smoothing the heights of the columns included in the column group area 2001, whereby a blank space 2003 is generated between the column group area 2001 and the column group area 2002. Hence, the page margin reduction processing unit 105 moves the block included in the column group area 2002 upward to thereby reduce the blank space 2003. When the page following the page 2000 is a column group area corresponding to the same single column group structure as that of the column group area 2002 and the leading block of the next page falls in the lower portion of the block included in the column group area 2002, the page margin reduction processing unit 105 may perform the following processing. Specifically, the page margin reduction processing unit 105 moves the leading block of the next page to the lower portion of the block included in the column group area 2002.

According to the information processing apparatus of the second embodiment, the heights of the columns included in the column group areas of a plurality of the columns are smoothed. Consequently, a blank space crossing in the horizontal direction (X-direction) such as the blank space 2003 as shown in FIG. 19C can be made between a column group area to be subject to smoothing processing and a column group area subsequent to the column group area. Then, the information processing apparatus of the second embodiment moves the block, which is included in a column group area subsequent to a column group area to be subject to smoothing processing, upward, whereby a blank space crossing in the horizontal direction can be reduced. Consequently, even when a column group structure changes from multiple columns to a single column, the blocks, which are included in a column group area corresponding to a single column group structure, are uniformly moved upward, whereby an excess margin in a page can be removed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-139192 filed Jun. 18, 2010, which is hereby incorporated by reference herein in its entirety.

What is claimed is:

1. An information processing apparatus comprising:
a determining unit configured to determine whether a page is configured by a plurality of columns;
a column reduction unit configured to reduce, when it is determined that the page is configured by the plurality of columns, a blank space of a first column by reducing a blank space between objects included in the first column to a predetermined distance;
a column movement unit configured to move a leading object of a second column to a blank space at a lower portion of the first column when the leading object of the second column falls in the blank space at the lower portion of the first column that has been generated by the reduction of the blank space between the objects of the first column by the column reduction unit;
a page reduction unit configured to reduce, when it is determined that the page is not configured by the plurality of columns, a blank space of the page by reducing a blank space between objects included in the page to a predetermined distance; and
a page movement unit configured to move a leading object of a following page that follows the page to a blank space at a lower portion of the page when the leading object of the following page falls in the blank space at the lower portion of the page that has been generated by the reduction of the blank space between the objects of the page by the page reduction unit.

2. The information processing apparatus according to claim 1, further comprising
a comparison unit configured to compare the height of the first column with the height of the second column after the object of the second column is moved by the column movement unit,
wherein, when the difference between the height of the first column and the height of the second column is equal to or greater than a threshold value as a result of the comparison performed by the comparison unit, the column movement unit returns a part of the object moved to the first column back to the second column such that the difference between the height of the first column and the height of the second column is equal to or less than the threshold value.

3. A method for controlling an information processing apparatus, the method comprising:

a determining step of determining whether a page is configured by a plurality of columns;
a column reduction step of reducing, when it is determined that the page is configured by the plurality of columns, a blank space of the first column by reducing a blank space between objects included in the first column to a predetermined distance;
a column movement step of moving a leading object of the second column to a blank space at a lower portion of the first column when the leading object of the second column falls in the blank space at the lower portion of the first column that has been generated by the reduction of a blank space between the objects of the first column in the column reduction step;
a page reduction step of reducing, when it is determined that the page is not configured by the plurality of columns, a blank space of the page by the reducing a blank space between objects included in the page to a predetermined distance; and
a page movement step of moving a leading object of a following page that follows the page to a blank space at a lower portion of the page when the leading object of the following page falls in the blank space at the lower portion of the page that has been generated by the reduction of the blank space between the objects of the page in the page reduction step.

4. The method for controlling an information processing apparatus according to claim 3, further comprising
a comparing step of comparing the height of the first column with the height of the second column after the object of the second column is moved in the column movement step,
wherein, when the difference between the height of the first column and the height of the second column is equal to or greater than a threshold value as a result of the height comparison performed in the comparing step, the column movement step includes returning a part of the object moved to the first column back to the second column such that the difference between the height of the first column and the height of the second column is equal to or less than the threshold value.

5. A non-transitory computer-readable storage medium storing an executable computer program for causing a computer to execute a method for controlling an information processing apparatus, the method comprising:
a determining step of determining whether a page is configured by a plurality of columns;
a column reduction step of reducing, when it is determined that the page is configured by the plurality of columns, a blank space of a first column by reducing a blank space between objects included in the first column to a predetermined distance;
a column movement step of moving a leading object of the second column to a blank space at a lower portion of the first column when the leading object of the second column falls in the blank space at the lower portion of the first column that has been generated by the reduction of a blank space between the objects of the first column in the column reduction step;
a page reduction step of reducing, when it is determined that the page is not configured by the plurality of columns, a blank space of the page by reducing a blank space between objects included in the page to a predetermined distance; and
a page movement step of moving a leading object of a following page that follows the page to a blank space at a lower portion of the page when the leading object of the following page falls in the blank space at the lower portion of the page that has been generated by the reduction of the blank space between the objects of the page in the page reduction step.

6. The non-transitory computer-readable storage medium according to claim 5, the method further comprising a comparing step of comparing the height of the first column with the height of the second column after the object of the second column is moved in the column movement step, wherein, when the difference between the height of the first column and the height of the second column is equal to or greater than a threshold value as a result of the height comparison performed in the comparing step, the column movement step includes returning a part of the object moved to the first column back to the second column such that the difference between the height of the first column and the height of the second column is equal to or less than the threshold value.

\* \* \* \* \*